US011601889B2

(12) United States Patent
Yerramalli et al.

(10) Patent No.: US 11,601,889 B2
(45) Date of Patent: Mar. 7, 2023

(54) POWER CONTROL OPTIMIZATION FOR WIRELESS COMMUNICATIONS

(71) Applicant: QUALCOMM Incorporated, San Diego, CA (US)

(72) Inventors: Srinivas Yerramalli, San Diego, CA (US); Seyed Ali Akbar Fakoorian, San Diego, CA (US); Xiaoxia Zhang, San Diego, CA (US); Mostafa Khoshnevisan, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/565,333

(22) Filed: Sep. 9, 2019

(65) Prior Publication Data

US 2020/0084727 A1    Mar. 12, 2020

Related U.S. Application Data

(60) Provisional application No. 62/730,401, filed on Sep. 12, 2018.

(51) Int. Cl.
*H04W 52/14*    (2009.01)
*H04W 72/044*    (2023.01)
(Continued)

(52) U.S. Cl.
CPC ......... *H04W 52/146* (2013.01); *H04W 24/10* (2013.01); *H04W 52/242* (2013.01);
(Continued)

(58) Field of Classification Search
None
See application file for complete search history.

(56) References Cited

U.S. PATENT DOCUMENTS

2012/0115463 A1* 5/2012 Weng ................... H04B 17/318
455/425
2015/0244444 A1* 8/2015 Mazzarese ........... H04B 17/309
370/252
(Continued)

FOREIGN PATENT DOCUMENTS

CN      102244923 A    11/2011
EP       2378672 A1    10/2011
(Continued)

OTHER PUBLICATIONS

CATT "NR Power Control Framework", Aug. 2017, 3GPP Draft' R1-1712440. pp. 1-16.*
(Continued)

*Primary Examiner* — Adnan Baig
(74) *Attorney, Agent, or Firm* — Holland & Hart LLP

(57) ABSTRACT

Methods, systems, and devices for wireless communications are described for uplink power control. A user equipment (UE) in communication with a base station may select a power control configuration for low latency or high reliability communications or semi-persistently scheduled communications. In some cases, a power control configuration may correspond to a reception point in a multi-reception-point environment. In some cases, the power control configuration may indicate a default transmit power for uplink communications. In some cases, a UE may perform, at the physical layer, measurements on a signal received from the base station and use this information to determine or select a transmit power for uplink communications. Selecting the low latency power control configuration may include selecting a set of transmit powers or a step size for transmit power adjustments specific to low latency or high reliability communications or semi-persistently scheduled communications.

30 Claims, 15 Drawing Sheets

(51) Int. Cl.
*H04W 24/10* (2009.01)
*H04W 72/04* (2023.01)
*H04W 52/24* (2009.01)
*H04W 72/12* (2023.01)

(52) U.S. Cl.
CPC ....... *H04W 72/042* (2013.01); *H04W 72/046* (2013.01); *H04W 72/0473* (2013.01); *H04W 72/1257* (2013.01)

(56) References Cited

U.S. PATENT DOCUMENTS

| 2018/0220403 | A1 | 8/2018 | Wilson et al. | |
|---|---|---|---|---|
| 2018/0324708 | A1* | 11/2018 | Cheng | H04W 52/24 |
| 2019/0190747 | A1* | 6/2019 | Park | H04L 25/0226 |
| 2019/0349864 | A1* | 11/2019 | Zhang | H04W 52/325 |
| 2020/0037360 | A1* | 1/2020 | Qian | H04W 52/225 |
| 2021/0119680 | A1* | 4/2021 | Matsumura | H04W 80/02 |

FOREIGN PATENT DOCUMENTS

| EP | 3793268 A1 | 3/2021 | | |
|---|---|---|---|---|
| WO | WO-2013006200 A1 * | 1/2013 | ........ | G06F 12/0246 |

OTHER PUBLICATIONS

CATT: "NR Power Control Framework", 3GPP Draft; R1-1712440_Power Control Framework, 3rd Generation Partnership Project (3GPP), Mobile Competence Centre ; 650, Route Des Lucioles ; F-06921 Sophia-Antipolis Cedex ; France, vol. RAN WG1, No. Prague, Czechia; Aug. 21-Aug. 25, 2017, Aug. 20, 2017 (Aug. 20, 2017), XP051315256, 16 Pages, Retrieved from the Internet: URL:http://www.3gpp.org/ftp/Meetings_3GPP_SYNC/RAN1/Docs/ [retrieved on Aug. 20, 2017], section 2; p. 1 section 2.1; p. 3-p. 4 section 2.2.1; p. 5 section 2.3.2; p. 9.
Ericsson: "On Power Control for NR", 3GPP Draft; R1-1702695, 3rd Generation Partnership Project (3GPP), Mobile Competence Centre ; 650, Route Des Lucioles; F-06921 Sophia-Antipolis Cedex; France, vol. RAN WG1, No. Athens, Greece; Feb. 13-Feb. 17, 2017, Feb. 7, 2017 (Feb. 7, 2017), XP051221536, 4 Pages, Retrieved from the Internet: URL:http://www.3gpp.org/ftp/tsg_ran/WG1_RL1/TSGR1_88/Docs/ [retrieved on Feb. 7, 2017], section 2.2-2.3; p. 2.
International Search Report and Written Opinion—PCT/US2019/050393—ISA/EPO—Nov. 4, 2019.
Vivo: "NR UL Power Control Framework", 3GPP Draft; R1-1715651_NR UL Power Control Framework, 3rd Generation Partnership Project (3GPP), Mobile Competence Centre ; 650, Route Des Lucioles ; F-06921 Sophia-Antipolis Cedex ; France, vol. RAN WG1, No. Nagoya, Japan; Sep. 18-Sep. 21, 2017, Sep. 11, 2017 (Sep. 11, 2017), XP051329123, 5 Pages, Retrieved from the Internet: URL:http://www.3gpp.org/ftp/tsg_ran/WG1_RL1/TSGR1_AH/NR_AH_1709/Docs/ [retrieved on Sep. 11, 2017], section 2.3; p. 3 section 2.4; p. 3-p. 4.
Vivo: "Remaining Issues on non-CA UL Power Control", 3GPP Draft; R1-1803842_Remaining Issues on Non-CA UL Power Control, 3rd Generation Partnership Project (3GPP), Mobile Competence Centre ; 650, Route Des Lucioles ; F-06921 Sophia-Antipolis Cedex ; France vol. RAN WG1, No. Sanya, China; Apr. 16-Apr. 20, 2018, Apr. 6, 2018 (Apr. 6, 2018), XP051413024, 5 Pages, Retrieved from the Internet: URL:http://www.3gpp.org/ftp/tsg%5Fran/WG1%5FRL1/TSGR1%5F92b/Docs/ [retrieved on Apr. 6, 2018], section 2.1-2.2; p. 2.
3GPP TS 36.213: "3rd Generation Partnership Project, Technical Specification Group Radio Access Network, Evolved Universal Terrestrial Radio Access (E-UTRA), Physical Layer Procedures (Release 14)", V14.7.0 (Jun. 2018), Jun. 2018, 49 Pages.
Taiwan Search Report—TW108132727—TIPO—Sep. 13, 2022.

\* cited by examiner

POWER CONTROL OPTIMIZATION FOR WIRELESS COMMUNICATIONS

CROSS REFERENCE

The present application for patent claims the benefit of U.S. Provisional Patent Application No. 62/730,401 by YERRAMALLI et al., entitled "POWER CONTROL OPTIMIZATION FOR LOW LATENCY TRAFFIC," filed Sep. 12, 2018, assigned to the assignee hereof, and expressly incorporated herein.

BACKGROUND

The following relates generally to wireless communications, and to power control optimization for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support power control optimization for wireless communications. For example, a user equipment (UE) in communication with a base station may select a power control configuration for low latency or high reliability communications or semi-persistently scheduled communications. An example of high-reliability communications and/or low latency communications may include communications with multiple transmission reception points (TRPs). In some examples, the power control configuration may support lower latency or higher reliability based on including a separate default transmission power or other parameters, the ability to perform transmission power adjustments based on path determinations at a physical layer or based on a portion of an allocated bandwidth, separate step sizes for transmission power adjustments, or other features.

In some examples, the power control configuration may support lower latency or higher reliability based on based on having separate transmission parameters for initial transmissions and retransmissions (e.g., there may be a first set of transmission parameters for initial transmissions and a second set of transmission parameters for retransmission). According to some aspects, a base station may determine a set of transmission configuration profiles, each of which may be an example of a power control configuration and may correspond to a respective TRP, and the UE may select a transmit power based on the transmission configuration profiles.

In some cases, a base station may transmit a signal (e.g., a reference signal) to the UE and the UE may perform signal strength, path loss, or power measurements based on the received signal. The UE may use this information to determine or select a transmit power for uplink communications. This determination may be done at the physical layer of the UE. In some aspects, selecting the power control configuration may include selecting the signal for performing such measurements. In some aspects, selecting the power control configuration may include selecting a set of transmit powers or a step size for transmit power adjustments specific to low latency or high reliability communications or semi-persistently scheduled communications. The UE may perform uplink communications (e.g., an uplink transmission or retransmission) according to the selected transmit power(s).

A method of wireless communication at a UE is described. The method may include identifying an uplink communication by the UE, the uplink communication for reception by a set of reception points associated with one or more base stations, selecting, based on the identifying, a power control configuration for the uplink communication from a set of power control configurations corresponding to the set of reception points, and transmitting the uplink communication according to the selected power control configuration.

An apparatus for wireless communication at a UE is described. The apparatus may include a processor, memory coupled to the processor, and instructions stored in the memory. The instructions may be executable by the processor to cause the apparatus to identify an uplink communication by the UE, the uplink communication for reception by a set of reception points associated with one or more base stations, select, based on the identifying, a power control configuration for the uplink communication from a set of power control configurations corresponding to the set of reception points, and transmit the uplink communication according to the selected power control configuration.

Another apparatus for wireless communication at a UE is described. The apparatus may include means for identifying an uplink communication by the UE, the uplink communication for reception by a set of reception points associated with one or more base stations, selecting, based on the identifying, a power control configuration for the uplink communication from a set of power control configurations corresponding to the set of reception points, and transmitting the uplink communication according to the selected power control configuration.

A non-transitory computer-readable medium storing code for wireless communication at a UE is described. The code may include instructions executable by a processor to identify an uplink communication by the UE, the uplink communication for reception by a set of reception points associated with one or more base stations, select, based on the identifying, a power control configuration for the uplink communication from a set of power control configurations corresponding to the set of reception points, and transmit the uplink communication according to the selected power control configuration.

Some examples of the method, apparatuses, and non-transitory computer-readable medium described herein may further include operations, features, means, or instructions for receiving, from a base station of the one or more base stations, signaling that indicates the set of power control configurations corresponding to the set of reception points.

In some examples of the method, apparatuses, and non-transitory computer-readable medium described herein, the selecting is further based at least in part on an indication of the power control configuration received from the one or more base stations.

In some examples of the method, apparatuses, and non-transitory computer-readable medium described herein, the indication of the power control configuration is received via a downlink control information (DCI) message.

In some examples of the method, apparatuses, and non-transitory computer-readable medium described herein, the set of power control configurations includes, for each reception point of the set, a respective power control configuration in which the reception point is a primary reception point for the uplink communication.

Some examples of the method, apparatuses, and non-transitory computer-readable medium described herein may further include operations, features, means, or instructions for measuring a downlink communication based on the selected power control configuration, and determining one or more transmit power parameters for transmitting the uplink communication based on the measuring.

In some examples of the method, apparatuses, and non-transitory computer-readable medium described herein, the downlink communication includes a reference signal and measuring the downlink communication includes measuring a reference signal received power (RSRP) for the reference signal.

Some examples of the method, apparatuses, and non-transitory computer-readable medium described herein may further include operations, features, means, or instructions for receiving, from the base station, an indication of a beam to use for the uplink communication, the beam associated with a reception point of the set, and transmitting the uplink communication via the beam associated with the reception point.

Some examples of the method, apparatuses, and non-transitory computer-readable medium described herein may further include operations, features, means, or instructions for determining, at a physical layer of the UE, an RSRP for a reference signal received by the UE and setting a transmit power for the uplink communication based on the RSRP as determined at the physical layer of the UE.

Some examples of the method, apparatuses, and non-transitory computer-readable medium described herein may further include operations, features, means, or instructions for determining, at the physical layer of the UE, a path loss based on the RSRP and setting a transmit power for the uplink communication based on the path loss for the downlink communication.

In some examples of the method, apparatuses, and non-transitory computer-readable medium described herein, the received power includes an RSRP.

Some examples of the method, apparatuses, and non-transitory computer-readable medium described herein may further include operations, features, means, or instructions for identifying a default transmit power for low latency or high reliability communications and setting a transmit power for the uplink communication based on the default transmit power for low latency or high reliability communications.

Some examples of the method, apparatuses, and non-transitory computer-readable medium described herein may further include operations, features, means, or instructions for receiving, from a base station, an indication of the default transmit power for low latency or high reliability communications.

Some examples of the method, apparatuses, and non-transitory computer-readable medium described herein may further include operations, features, means, or instructions for identifying a scheduling type for the uplink communication, identifying a default transmit power for the scheduling type and setting a transmit power for the uplink communication based on the default transmit power for the scheduling type.

Some examples of the method, apparatuses, and non-transitory computer-readable medium described herein may further include operations, features, means, or instructions for receiving a downlink communication over a first bandwidth, determining a path loss of the downlink communication over a second bandwidth that may be narrower than the first bandwidth and selecting the power control configuration based on the path loss over the second bandwidth.

In some examples of the method, apparatuses, and non-transitory computer-readable medium described herein, determining the path loss over the second bandwidth may include operations, features, means, or instructions for identifying a set of resource blocks (RBs) semi-persistently scheduled for the UE and measuring the path loss based on a reference signal received via the set of RBs.

In some examples of the method, apparatuses, and non-transitory computer-readable medium described herein, selecting the power control configuration may include operations, features, means, or instructions for selecting a set of transmit powers specific to low latency or high reliability communications or semi-persistently scheduled communications.

In some examples of the method, apparatuses, and non-transitory computer-readable medium described herein, transmitting the uplink communication according to the selected power control configuration may include operations, features, means, or instructions for selecting a transmit power from the set of transmit powers specific to low latency or high reliability communications or semi-persistently scheduled communications and transmitting the uplink communication at the selected transmit power.

In some examples of the method, apparatuses, and non-transitory computer-readable medium described herein, selecting the power control configuration may include operations, features, means, or instructions for selecting a step size for transmit power adjustments specific to low latency or high reliability communications or semi-persistently scheduled communications.

In some examples of the method, apparatuses, and non-transitory computer-readable medium described herein, wherein the selected power control configuration includes a first set of transmission parameters for initial transmissions and a second set of transmission parameters for retransmission, and may include operations, features, means, or instructions for identifying the uplink communication as an initial transmission, transmitting the uplink communication according to the first set of transmission parameters, and retransmitting the uplink communication according to the second set of transmission parameters.

In some examples of the method, apparatuses, and non-transitory computer-readable medium described herein, selecting the power control configuration may include operations, features, means, or instructions for selecting a set of transmission configuration profiles, where each transmission configuration profile in the set corresponds to a respective TRP.

Some examples of the method, apparatuses, and non-transitory computer-readable medium described herein may further include operations, features, means, or instructions for receiving an indication of a transmission configuration profile in the set, measuring a downlink communication according to the indicated transmission configuration profile and determining one or more transmit power parameters for transmitting the uplink communication based on the measuring.

A method of wireless communication at a base station is described. The method may include selecting a power control configuration for an uplink communication from a UE, the uplink communication for reception by a set of reception points, and the power control configuration included in a set of power control configurations corresponding to the set of reception points, transmitting, to the UE, an indication of the selected power control configuration, and receiving, from the UE, the uplink communication in accordance with the selected power control configuration.

An apparatus for wireless communication at a base station is described. The apparatus may include a processor, memory coupled to the processor, and instructions stored in the memory. The instructions may be executable by the processor to cause the apparatus to select a power control configuration for an uplink communication from a UE, the uplink communication for reception by a set of reception points, and the power control configuration included in a set of power control configurations corresponding to the set of reception points, transmit, to the UE, an indication of the selected power control configuration, and receive, from the UE, the uplink communication in accordance with the selected power control configuration.

Another apparatus for wireless communication at a base station is described. The apparatus may include means for selecting a power control configuration for an uplink communication from a UE, the uplink communication for reception by a set of reception points, and the power control configuration included in a set of power control configurations corresponding to the set of reception points, transmitting, to the UE, an indication of the selected power control configuration, and receiving, from the UE, the uplink communication in accordance with the selected power control configuration.

A non-transitory computer-readable medium storing code for wireless communication at a base station is described. The code may include instructions executable by a processor to select a power control configuration for an uplink communication from a UE, the uplink communication for reception by a set of reception points, and the power control configuration included in a set of power control configurations corresponding to the set of reception points, transmit, to the UE, an indication of the selected power control configuration, and receive, from the UE, the uplink communication in accordance with the selected power control configuration.

Some examples of the method, apparatuses, and non-transitory computer-readable medium described herein may further include operations, features, means, or instructions for transmitting, to a UE, signaling that indicates the set of power control configurations corresponding to the set of reception points.

In some examples of the method, apparatuses, and non-transitory computer-readable medium described herein, the indication of the selected power control configuration is transmitted via a DCI message.

In some examples of the method, apparatuses, and non-transitory computer-readable medium described herein, the set of power control configurations includes, for each reception point of the set, a respective power control configuration in which the reception point is a primary reception point for the uplink communication.

Some examples of the method, apparatuses, and non-transitory computer-readable medium described herein may further include operations, features, means, or instructions for transmitting, to the UE, an indication of a beam to use for the uplink communication, the beam associated with a reception point of the set.

In some examples of the method, apparatuses, and non-transitory computer-readable medium described herein, transmitting the indication of the power control configuration may include operations, features, means, or instructions for transmitting, to the UE, an indication to adjust the transmit power of the uplink communication based on physical layer measurements by the UE.

In some examples of the method, apparatuses, and non-transitory computer-readable medium described herein, transmitting the indication of the power control configuration may include operations, features, means, or instructions for transmitting, to the UE, an indication to adjust the transmit power of and high reliability communications by the UE based on physical layer measurements by the UE.

In some examples of the method, apparatuses, and non-transitory computer-readable medium described herein, determining the power control configuration may include operations, features, means, or instructions for determining a default transmit power or step size for transmit power adjustments that is specific to low latency or high reliability communications or semi-persistently scheduled communications.

In some examples of the method, apparatuses, and non-transitory computer-readable medium described herein, determining the power control configuration may include operations, features, means, or instructions for determining a default transmit power for semi-persistently scheduled communications.

In some examples of the method, apparatuses, and non-transitory computer-readable medium described herein, transmitting the indication of the power control configuration may include operations, features, means, or instructions for configuring the UE for communications over a first bandwidth and transmitting, to the UE, an indication to adjust the transmit power of the uplink communication based on a measurement over a second bandwidth that may be narrower than the first bandwidth.

In some examples of the method, apparatuses, and non-transitory computer-readable medium described herein, the second bandwidth corresponds to a set of one or more RBs semi-persistently scheduled for communications by the UE.

In some examples of the method, apparatuses, and non-transitory computer-readable medium described herein, determining the low latency power control configuration may include operations, features, means, or instructions for determining a set of transmit powers specific to low latency or high reliability communications or semi-persistently scheduled communications.

In some examples of the method, apparatuses, and non-transitory computer-readable medium described herein, determining the low latency power control configuration may include operations, features, means, or instructions for determining a first set of transmission parameters for initial transmissions and a second set of transmission parameters for retransmission.

In some examples of the method, apparatuses, and non-transitory computer-readable medium described herein, determining the low latency power control configuration may include operations, features, means, or instructions for determining a set of transmission configuration profiles, where each transmission configuration profile in the set corresponds to a respective TRP.

DETAILED DESCRIPTION

Figure 1:
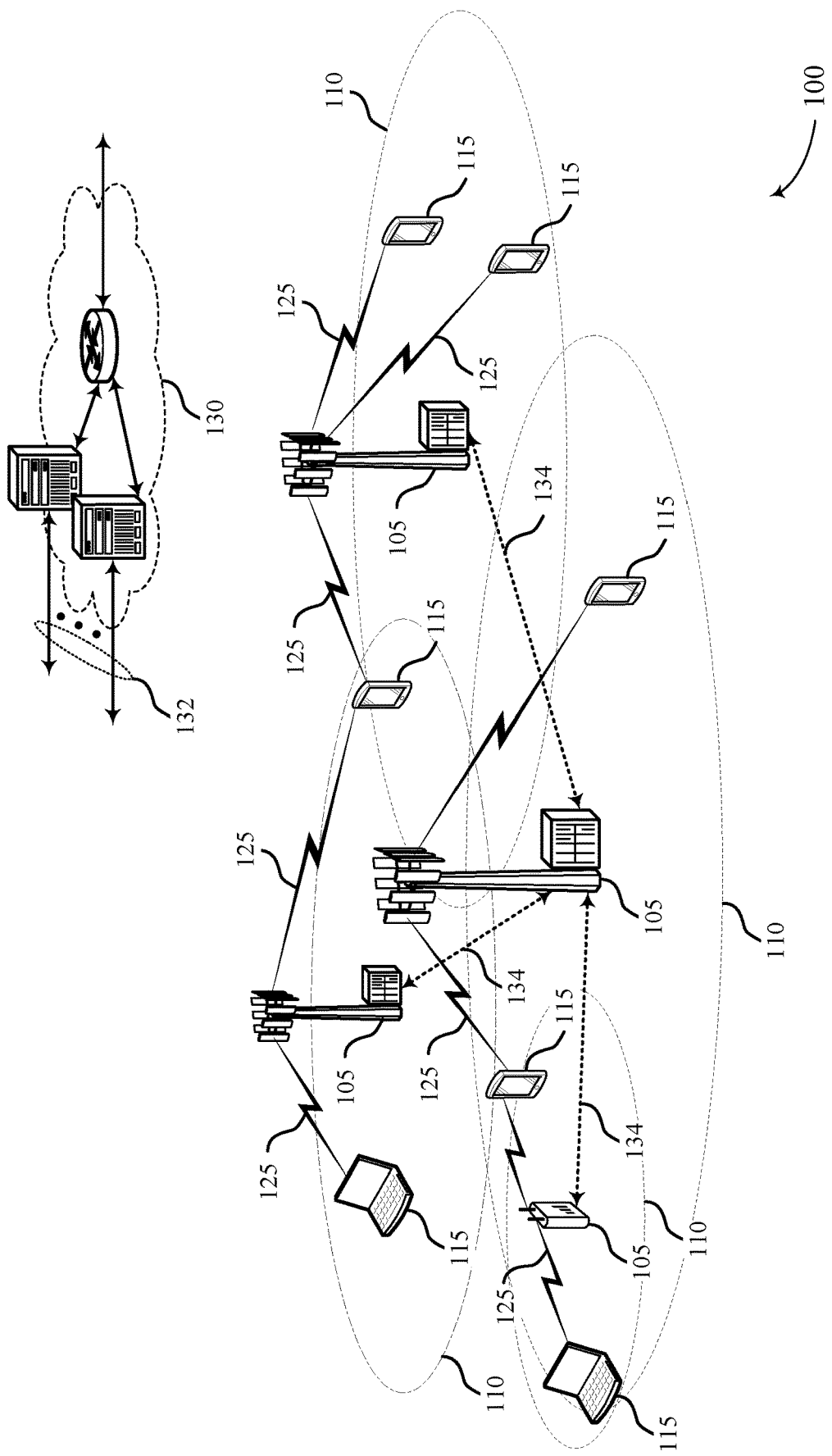
FIGS. 1 and 2 illustrate example wireless communications systems that support power control optimization for wireless communications in accordance with aspects of the present disclosure.

Some wireless communications systems may support low latency or high reliability communications between a user equipment (UE) and a base station. For instance, in an internet of things (IoT) system such as an industrial IoT system, communications between devices may conform to strict low latency or high reliability standards. If devices do not exceed or meet these targets, however, communications between the devices may not be successful.

According to some aspects, a UE may determine transmit power for low latency or high reliability communications or for semi-persistently scheduled communications. The transmit power may be determined based on a power control configuration for various communication types. A power control configuration may refer to a set of one or more parameters (or values thereof) or mechanisms used by the UE to determine a transmit power for one or more uplink communications. For instance, the UE may select a power control configuration from a set of power control configurations for low latency or high reliability communications, semi-persistently scheduled communications, or other communications. In some cases, the transmit power may be determined based on a default transmit power for uplink communications. For instance, separate default power values may be provided for various uplink schemes (e.g., downlink control information (DCI), grant free, semi-persistent scheduling (SPS)).

In some cases, a UE may determine transmit power based on path loss determined at the physical layer of the UE. The path loss may be determined using a sub-band of a bandwidth part (BWP) allocated to the UE. The UE also may be capable of determining step size for power control commands. The step size may be based on different communication types. According to some examples, transmission parameters (e.g., transmit power) may be configured differently for initial transmissions and retransmissions. In cases with multiple transmission reception points (TRPs), a base station may transmit signaling to the UE that conveys different transmission profiles for each of the multiple TRPs. In some cases, transmission profiles may be examples of power control configurations.

Particular aspects of the subject matter described herein may be implemented to realize one or more advantages. The described techniques may support improvements in power control for low latency traffic and/or high reliability traffic (e.g., communications associated with reception at multiple TRPs), such as decreasing signaling overhead, and improving efficiency, among other advantages. As such, supported techniques may include improved network operations and, in some examples, may promote network efficiencies, among other benefits.

Aspects of the disclosure are initially described in the context of a wireless communications system. Aspects are then described with respect to a process flow. Aspects of the disclosure are further illustrated by and described with reference to apparatus diagrams, system diagrams, and flowcharts that relate to power control optimization for wireless communications.

FIG. 1 illustrates an example of a wireless communications system 100 that supports power control optimization for wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105 or a UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals (SSs), reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105, or a combination thereof. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or a UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., SSs or system information) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105, or UEs 115 that can support simultaneous communications via carriers associated with more than one different carrier bandwidth, or a combination thereof.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may support low latency or high reliability communications between wireless devices (e.g., communications between a UE 115 (e.g., an IoT device) and a base station 105 in an industrial automation system). Low latency communications may be associated with a given target latency (e.g., 3 ms, 4 ms, 7 ms) and high reliability communications may correspond to certain block error rate (BLER) targets (e.g., $1\times10^{-5}$, $1\times10^{-6}$, $1\times10^{-7}$). Communications between devices in such a system may therefore conform to these low latency or high reliability standards. If devices do not exceed or meet these targets, however, communications between the devices may not be successful.

Further, in systems that employ SPS, a base station 105 may transmit power control information to each UE 115 operating according to SPS, which may result in increased overhead due to the number of downlink control messages (e.g., a physical downlink control channel (PDCCH) for each UE 115 operating according to SPS) transmitted by the base station 105. In some cases, a decrease in system throughput or capacity may be experienced due to the number of resources being used for communications of power control information. In SPS systems, when a base station 105 determines a change in transmission parameters such as the modulation and coding scheme (MCS) for a UE 115, the change may result in changes (e.g., to MCS) for other UEs 115 that are also scheduled in a semi-persistent manner. This may lead to additional computations and overhead signaling for a base station 105 as the base station 105 informs the other UEs 115 of their respective changes.

In some cases, a UE 115 may measure path loss by performing measurements (e.g., signal strength or power measurements) of one or more signals (e.g., a primary synchronization signal (PSS), a secondary synchronization signal (SSS)) received from a base station 105. Measurements may be performed periodically (e.g., every 40 ms) by the physical layer (L1) and may be delivered to an upper layer such as the upper layer for processing, which may occur every 200 ms. In systems with less stringent targets (e.g., in an LTE system having a BLER target of 10%), the upper layer may be capable of determining transmission parameters (e.g., transmission power, MCS) using the information measured by the L1 layer and compensate for the measured path loss in subsequent transmission(s). In systems operating according to more strict standards (e.g., in a low latency or high reliability system such as ultra-reliable low latency communications (URLLC) systems), by the time the upper layer receives information from the L1 layer regarding the path loss, the path loss may have already changed or several transmissions may have already been performed that had not compensated for the measured path loss. That is, when operating in systems with strict low latency or high reliability targets, small changes in path loss (e.g., 1 dB, 2 dB) may impact performance such that target BLER or latencies are not met.

According to some aspects, a UE 115 may determine (e.g., select) a power control configuration for one or more uplink communications. The uplink communications may be low latency or high reliability communications (e.g., communications for multiple reception points, such as multiple TRPs). In some cases, a base station 105 may transmit a power control configuration indication to a UE 115, which may indicate the power control configuration for the UE 115 to select. In some cases, the power control configuration may specify one or more parameters related to the determination of a transmit power for an uplink communication by the UE 115. For example, the power control configuration may specify a default transmit power that the UE 115 is to use for uplink communication. As another example, the power control configuration may specify a reference signal to use for RSRP or other path loss-related measurements. Additionally or alternatively, the power control configuration may specify a layer at which to perform such measurements and make related adjustments (the physical layer of the UE 115). Other examples of parameters may include a bandwidth to use for path loss-related measurements (e.g. narrower than an allocated bandwidth, such as a narrower than an allocated BWP), a step size to use for transmit power adjustments (e.g., in response to transmit power commands (TPCs)), or different parameters for initial transmissions versus retransmissions (e.g., retransmissions as part of a HARQ process). Additionally or alternatively, a power control configuration may correspond to a respective reception point (e.g., TRP)—for example, for an uplink communication intended for reception by two or more reception points, the UE 115 may determine a transmit power based on a power control configuration that corresponds to a primary or preferred reception point among the two or more reception points. Through these techniques, for example, a UE 115 may be capable of meeting the targets for low latency or high reliability communications.

Figure 2:
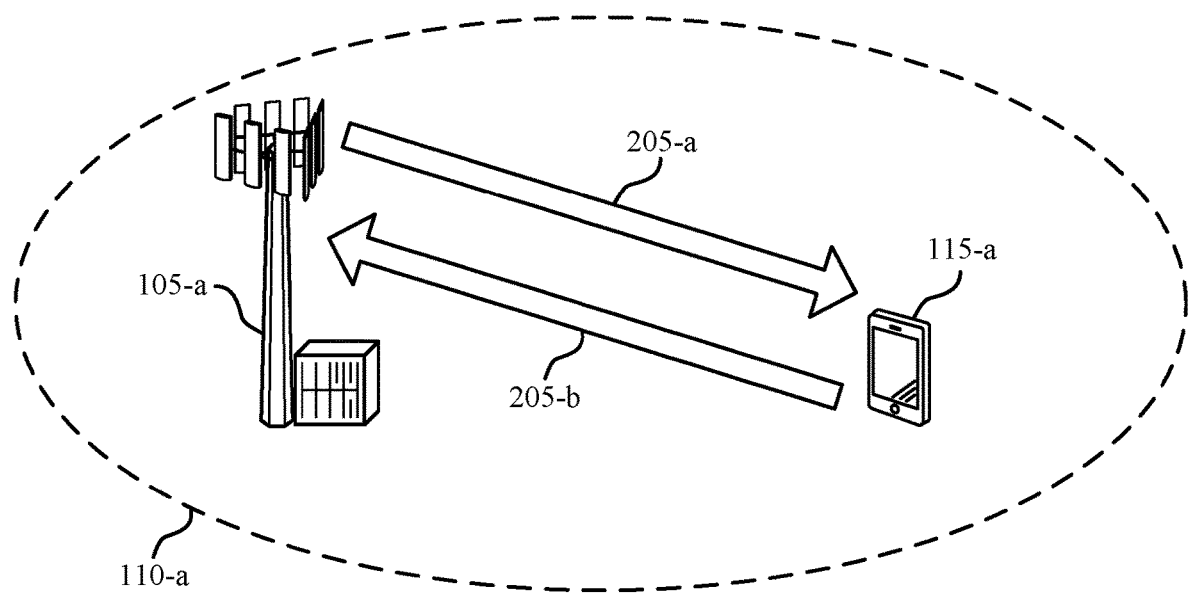

FIG. 2 illustrates an example of a wireless communications system 200 that supports power control optimization for wireless communications in accordance with aspects of the present disclosure. In some examples, wireless communications system 200 may implement aspects of wireless communications system 100. Wireless communications system 200 includes base station 105-a and UE 115-a, which may be examples of the corresponding devices described herein (e.g., in FIG. 1). Base station 105-a may transmit downlink messages to UE 115-a via communication link 205-a and may receive uplink messages from UE 115-a via communication link 205-b.

Wireless communications system 200 may support uplink power control according to the techniques described herein. Through adequate uplink power control, the signal to interference plus noise ratio (SINR) may be sufficiently maintained. Power control for uplink shared channels (e.g., physical uplink shared channel (PUSCH)) may include various components such as a capable or maximum configured power as well as a nominal or default power. The nominal or default power may be configured for a given PUSCH (e.g., P_0_nominal_PUSCH (j)) or may be specific to UE 115-a (e.g., P_0_UE_PUSCH(j)). Power control may also depend on the number of scheduled resources (e.g., RBs) for a UE 115 or path loss. For instance, the power control may be associated with a path loss scaling factor ($\alpha$) to compensate for path loss experienced by UE 115-a and UE 115-b, which may be based on a path loss value (e.g., determined by a higher layer and based on received power measurements such as reference signal received power (RSRP) of a signal (e.g., an SS block signal or a reference signal within a given BWP). Power control may involve the adjustment of transmission parameters such as transmit power (e.g., via a transmit power command (TPC)) or the MCS. Power control may be employed for uplink channels such as the PUSCH, as described herein, as well as other uplink channels such as an uplink control channel (e.g., a physical uplink control channel (PUCCH)) or an uplink reference signal (e.g., a sounding reference signal (SRS)).

In some cases, wireless communications system 200 may operate according to a given set of latency or reliability requirements. For instance, wireless communications system 200 may be an IoT system, an industrial automation system, an industrial IoT system, or any other system associated with low latency or high reliability standards (e.g., URLLC or multi-TRP communications (which may in some cases be examples of URLLC communications)). In some such systems, packet sizes may be relatively small. For instance, transmission packet may include various command and control information, as opposed to large amounts of data. The transmissions occupy a relatively small bandwidth (low number of RBs) and a large number of UEs 115 may be multiplexed.

Wideband synchronization signal block (SSB) or channel state information reference signal (CSI-RS) power may not accurately reflect the path loss experienced on the scheduled BWP for small packets and a difference of 2 dB or more between the wideband and narrowband pathloss may be common. If power control is based on an upper layer (e.g., layer 3) path loss estimation, the reaction to the path loss may not be effective due to the fast changes in path loss.

In some cases, wireless communications system 200 may employ SPS. In such cases, if there is an error in an uplink transmission from UE 115-a, base station 105-a may adjust one or more transmission parameters (e.g., lower the MCS) for UE 115-a. If SPS is used extensively throughout wireless communications system 200 in scheduling multiple UEs 115, changing RB allocation for UE 115-a may result in changes to RB allocation for several other UEs 115, which may result in an increase in overhead and it may be more efficient for base station 105-*a* to adapt transmit power for UE 115-*a* rather than change the MCS. In some instances, even if MCS is chosen conservatively, a 2-3 dB change in path loss may result in code rate changes (e.g., reduced by almost ½), which may lead to extensive MCS change(s).

UE 115-*a* may be capable of determining or otherwise selecting a power control configuration for uplink transmission to base station 105-*a* via communication link 205-*b*. For instance, UE 115-*a* may identify a separate default transmit power value (P_0_nominal_PUSCH) for low latency or high reliability uplink communications. In some cases, separate, distinct default transmit power values may exist for various other PUSCH schemes (e.g., DCI scheduled transmissions, grant free transmissions, SPS) as well as PUCCH and SRS transmissions. According to some aspects, base station 105-*a* may transmit an indication of the default transmit power value(s) and respective schemes, if any, to UE 115-*a* via communication link 205-*a* as part of one or more power control configurations. Base station 105-*a* may determine default transmit power values or values of related parameters for various communication types (e.g., low latency, high reliability communications, or semi-persistently scheduled communications, or a combination thereof) and transmit an indication of the values to UE 115-*a*. A power control configuration may specify a set of such values, and UE 115-*a* may use this information to determine transmit powers for uplink communications. For example, the default transmit power value for low latency or high reliability uplink communications may be higher than for at least some other types of uplink communications, which may improve reliability and improve latency (e.g., avoid retransmissions).

In some examples, a power control configuration may specify the basis of path loss related determinations (e.g., measurements), or the layer at which such determinations are made, or related adjustments to transmit power. For instance, a power control configuration may specify a downlink signal (e.g., reference signal) that UE 115-*a* is to use for path loss related determinations. UE 115-*a* may receive the downlink signal from base station 105-*a* via communication link 205-*a*. In some cases, the power control configuration may specify that, at its physical layer, UE 115-*a* may perform measurements (e.g., RSRP measurements) of the downlink signal and determine path loss for the resources of the BWP over which the downlink signal was transmitted. Based on the measurements and path loss, UE 115-*a* may determine a transmit power for uplink communications. This technique allows UE 115-*a* to quickly react to any changes in path loss—and thus reduce latency—as the power control configuration is determined at the physical layer (L1) of UE 115-*a* rather than at an upper layer (e.g., layer 2 or 3), which would take additional time to calculate. In some cases, the RSRP as determined at the physical layer may be filtered for a short time scale (e.g., over 5-10 ms), which is less than the 200 ms or more used for upper layer path loss determination. This path loss determination at the physical layer may be applied for low latency or high reliability traffic while other traffic uses a long-term path loss metric (e.g., determined via an upper layer). Further, independent power control adjustments may be signaled from base station 105-*a* to UE 115-*a* for a given communication or traffic type (e.g., low latency, high reliability, SPS, standard latency and reliability).

In some examples, a power control configuration may allow UE 115-*a* to determine the path loss used for power control based on a sub-band of a BWP or other relevant bandwidth allocated to UE 115-*a* for uplink communication. For instance, for SPS scheduling, UE 115-*a* may use the reference signal on the RBs configured for UE 115-*a* in determining the path loss for power control. This may reduce the amount of overhead and calculations for determining path loss at UE 115-*a*, and thus may provide increased reliability and reduced latency. Further, this may allow path loss determinations to be more tailored to bandwidth used for the subsequent low latency or high reliability uplink communication, which in some cases may be transmitted over the sub-band.

In some examples, a power control configuration may specify step sizes (e.g., a table) for power control commands. The step sizes may be configured based on communication type (e.g., low latency, high reliability communications, or semi-persistently scheduled communications, or a combination thereof) and may indicate power adjustments for uplink communications from UE 115-*a* in response to TPCs received from base station 105-*a*. For example, the step sizes for low latency or high reliability uplink communication may be larger than for some other communication types, which may support more rapid achievement of a requisite transmit power level and thus increased reliability and reduced latency.

In some examples, a power control configuration may specify different transmission parameters (e.g., transmit power or resources) for initial transmission and retransmissions. For instance, base station 105-*a* may transmit an indication of the different transmission parameters for initial and retransmissions by indicating one or more related power control configurations (e.g., a first power control configuration for initial transmission, and a second power control configuration for retransmissions). UE 115-*a* may perform uplink initial transmissions and retransmission according to the different parameters. For example, retransmissions for low latency or high reliability uplink communication may be performed with greater transmit power than initial transmissions—possibly with a larger delta than for some other communication types—which may support more rapid achievement of a requisite transmit power level. In some cases, retransmissions may occur due to UE 115-*a* receiving a negative acknowledgment (NACK) from a base station 105.

One form of high reliability communications (which may also be low latency in at least some cases) may be multi-TRP communications. A TRP may refer to a set of hardware (e.g., a cluster of one or more antennas) at a physical location that supports reception of signals for decoding and other processing by a base station 105. For example, the TRP may be coupled with, included in, or otherwise associated with the base station 105. In some cases, a base station 105 may be associated with one TRP. In other cases, a base station 105 may be associated with multiple TRPs, which may be located at a different physical locations from one another, though each TRP may be associated with (e.g., coupled with) the base station 105.

When configured for multi-TRP communications UE 115-*a* may be connected to one or more associated base stations 105, and thus may be connected to (e.g. have established communications) multiple TRPs. A multi-TRP communication may be primarily intended (targeted, configured) for reception at a preferred (primary, target) TRP, but may be configured so as to also support reception at one or more other TRPs. Multi-TRP communication may have benefits, such as enhanced reliability of communications, as the multiple TRPs may provide redundancy benefits, diversity benefits, or both, for example. For example, the preferred TRP may not be able to efficiently receive the uplink transmission (e.g., the preferred TRP may be blocked), but the uplink transmission may nevertheless be received at one or more other TRPs.

In some cases, UE 115-a may transmit a multi-TRP communication as a single uplink transmission (e.g., with increased transmit power relative to at least some other communications). In other cases, UE 115-a may transmit a multi-TRP communication as a series of uplink transmissions (e.g., multiple uplink transmissions carrying the same data, sent either concurrently or sequentially, in the same or different directions).

UE 115-a may be configured for multi-TRP communications by base station 105-a, which may be associated with the preferred TRP. For example, base station 105-a may indicate to UE 115-a multiple transmission power control profiles, which may be examples of power control configurations in the multi-TRP context. For example, each transmission power control profile may correspond to a power control configuration for UE 115-a to use when a respective TRP is the preferred TRP.

Base station 105-a may indicate the multiple transmission power control profiles to UE 115-a via RRC or other signaling. Base station 105-a may dynamically (e.g., via a DCI message) indicate to UE 115-a which of the multiple transmission power control profiles UE 115-a is to utilize for uplink communications. For example, when a first TRP is the preferred TRP, base station 105-a may indicate that UE 115-a is to use a first transmission power control profile, which may specify that UE 115-a is to use a first reference signal transmitted by the first TRP to determine path loss and related power control parameters, and thus a transmit power for a subsequent uplink communication. And when a second TRP is the preferred TRP, base station 105-a may indicate that UE 115-a is to use a second transmission power control profile, which may indicate that UE 115-a is to use a second reference signal transmitted by the second TRP to determine path loss and related power control parameters, and thus ultimately a transmit power for a subsequent uplink communication. Additionally or alternatively to indicating what reference signal to use, a transmission power control profile may specify any other parameter or related value as described herein in the context of power control configurations. In some cases, an indication of a transmission power control profile may be or include an indication of a TRP (e.g., the preferred TRP for the transmission power control profile).

In some cases, base station 105-a may configure UE 115-a with multiple Transmission Configuration Indicator (TCI) states. By indicating to UE 115-a the applicable TCI state for a downlink transmission, base station 105-a may indicate, at least in part, the beam or set of beams that UE 115-a is to use to receive the downlink transmission. In some cases, whether as part of one or more TCI states or otherwise (e.g., as part of a transmission power control profile), base station 105-a may also configure UE 115-a with sets of one or more beam directions, each set corresponding to a respective TRP being the preferred TRP, that UE 115-a is to use for multi-TRP uplink communications. For a given multi-TRP uplink communication, base station 105-a may determine a first TRP as the preferred TRP and indicate (e.g., dynamically) to UE 115-a to transmit the uplink communication using the set of one or more beam directions corresponding to the first TRP being the preferred TRP.

Thus, base station 105-a may configure UE 115-a with any number of transmission power control profiles corresponding to any number of TRPs and indicate (e.g., dynamically) which transmission power control profile UE 115-a is to use for a subsequent uplink communication. Additionally or alternatively, base station 105-a may configure UE 115-a with any number of uplink beam sets corresponding to any number of TRPs and indicate (e.g., dynamically) which uplink beam set UE 115-a is to use for a subsequent uplink communication. In some cases, a dynamic indication may be received via a PDCCH (e.g., as part of a DCI message). In some cases, the DCI message may include a grant of shared resources for the uplink communication—that is, a grant for UE 115-a to perform an uplink communication may further include an indication of a transmission power control profile and/or an uplink beam set for the uplink communication.

Figure 3:
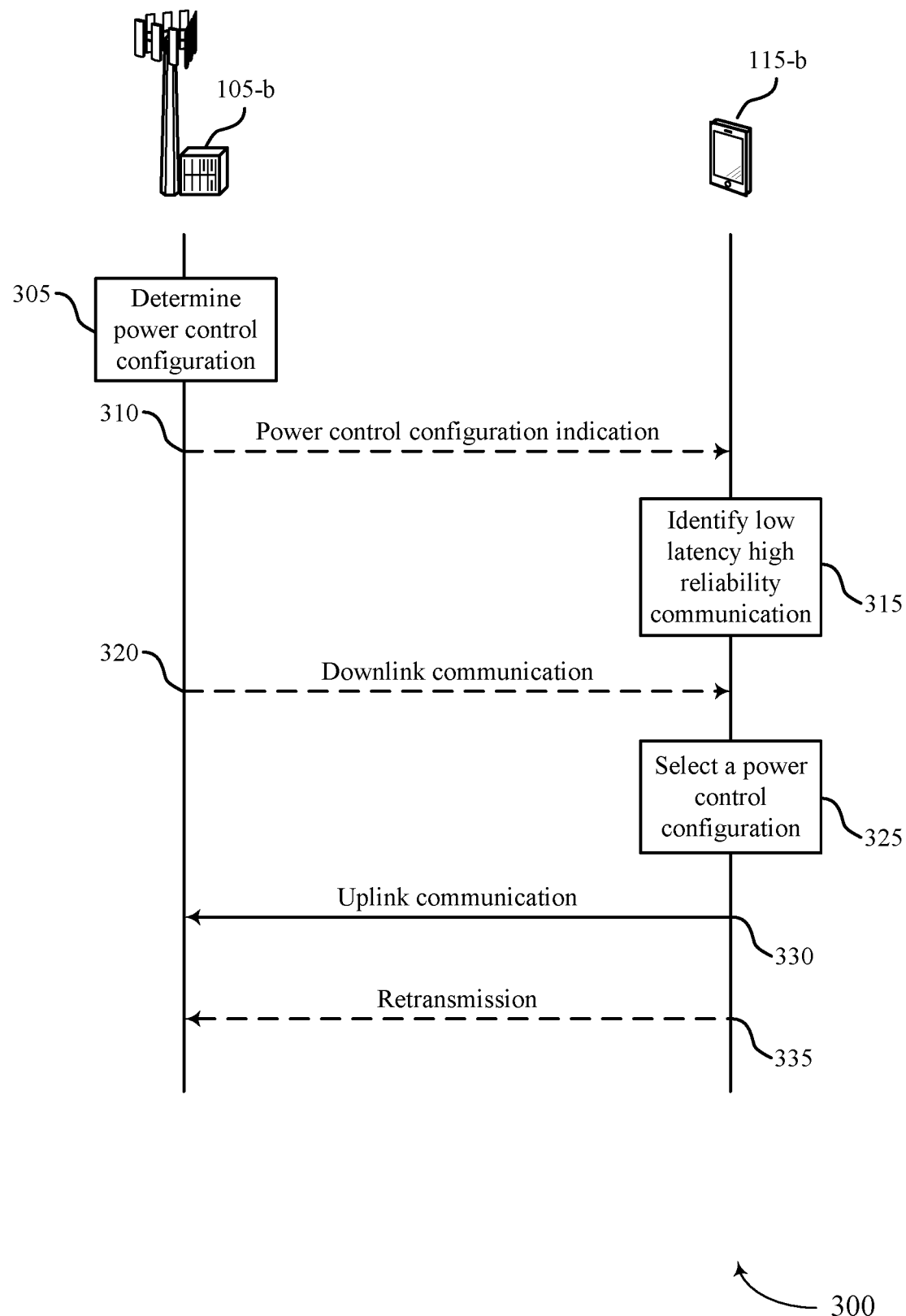
FIG. 3 illustrates an example of a process flow that supports power control optimization for wireless communications in accordance with aspects of the present disclosure.

FIG. 3 illustrates an example of a process flow 300 that supports power control optimization for wireless communications in accordance with aspects of the present disclosure. In some examples, process flow 300 may be implemented by aspects of wireless communications systems 100 or 200. Process flow 300 includes base station 105-b in communication with UE 115-b, which may be examples of the corresponding devices described herein (e.g., in FIGS. 1 and 2). Though shown in a particular order, the operations illustrated and described in process flow 300 may be performed in any order and some operations may be included or removed without departing from the scope of the present disclosure.

At 305, base station 105-b may determine a power control configuration (e.g., a power control configuration for low latency or high reliability communications, such as multi-TRP communications). In some cases, determining the power control configuration may include determining a default transmit power for low latency communications, high reliability communications, or semi-persistently scheduled communications, or a combination thereof. Determination of the power control configuration also may include determining a set of transmit powers for low latency or high reliability communications or semi-persistently scheduled communications. In some examples, the power control configuration may have separate transmission parameters for initial transmission and retransmissions (e.g., base station 105-b may determine a first set of transmission parameters for initial transmissions and a second set of transmission parameters for retransmission). According to some aspects, base station 105-b may determine a preferred TRP and determine the power control configuration by selecting a transmission configuration profile associated with the preferred TRP.

At 310, base station 105-b may optionally transmit a power control configuration indication to UE 115-b. In some examples, transmitting the power control configuration indication includes transmitting an indication for UE 115-b to adjust the transmit power of uplink communications based on physical layer measurements performed by UE 115-b. In some cases, the power control configuration may specify a reference signal to use for RSRP or other path loss-related measurements. Additionally or alternatively, the power control configuration may specify a layer at which to perform such measurements and make related adjustments (the physical layer of the UE 115). In some cases, base station 105-b may configure UE 115-b for communications over a first bandwidth and transmit an indication to UE 115-b to adjust the transmit power of uplink communications based on measurement(s) of a second bandwidth narrower than the first bandwidth. For instance, the second bandwidth may correspond to a set of one or more RBs semi-persistently scheduled for communications by UE 115-b.

At 315, UE 115-b may identify an uplink communication. For example, UE 115-b may identify an uplink communication for reception by a set of reception points associated with one or more base stations, or otherwise having a latency or reliability requirement above a threshold.

At 320, base station 105-*b* (or another base station 105, if base station 105-*b* is not associated with the preferred TRP) may optionally transmit a downlink communication (e.g., a PSS/SSS) to UE 115-*b* and UE 115-*b* may perform measurements of the downlink communication based on the power control configuration indication received at 310. For instance, UE 115-*b* may determine, at a physical layer of UE 115-*b*, a received power (e.g., RSRP) for the downlink communication (e.g., reference signal) received at 320. In some examples, UE 115-*b* may determine, at the physical layer of UE 115-*b*, a path loss based on the RSRP. In some cases, UE 115-*b* may determine a path loss of the downlink communication over a second bandwidth that may be narrower than the first bandwidth over which the downlink communication is received. Determining the path loss over the second bandwidth may include identifying a set of RBs semi-persistently scheduled for UE 115-*b* and measuring the path loss based on a reference signal received via the set of RBs.

At 325, UE 115-*b* may select a power control configuration for an uplink communication (e.g., uplink transmission or an uplink retransmission). For example, UE 115-*b* may identify a default transmit power for (e.g., based on the power control configuration indication received at 310). In some cases, UE 115-*b* may set a transmit power for the uplink communication based on the default transmit power, or based on the RSRP as determined at the physical layer of UE 115-*b* in 320, or based on another aspect of the power control configuration indication received at 310. In some cases, selecting the power control configuration may be based on the path loss over the second bandwidth as determined in 320. In some aspects, UE 115-*b* may identify a scheduling type for the uplink communication and a default transmit power for the scheduling type (e.g., based on the power control configuration indication received at 310). UE 115-*b* may set a transmit power for the uplink communication based on the default transmit power for the scheduling type.

In some examples, UE 115-*b* may select at 325, based on the identifying at 315, a power control configuration for the uplink communication from a set of power control configurations corresponding to a set of reception points (e.g., TRPs). Selecting the power control configuration may include selecting a set of transmit powers or a step size for transmit power adjustments specific to low latency or high reliability communications or semi-persistently scheduled communications. In some aspects, the low latency power control configuration selection includes identifying a first set of transmission parameters for initial transmissions and identifying a second set of transmission parameters for retransmission. For example, UE 115-*b* may receive at 310 an indication of a transmission configuration profile in the set, measure the downlink communication received at 320 according to the indicated transmission configuration profile, and determine one or more transmit power parameters for transmitting the uplink communication based on the measuring. Though FIG. 3 illustrates an example in which UE 115-*b* selects a power control configuration after receiving the downlink communication 320, in other examples UE 115-*b* may additionally or alternatively select a power control configuration before receiving the downlink communication 320 (e.g., to determine which downlink communication 320 to monitor and measure) or independent of the downlink communication 320 (e.g., downlink communication 320) may be optional.

At 330, UE 115-*b* may transmit the uplink communication according to the selected power control configuration. In some examples, UE 115-*b* may transmit the uplink communication at a transmit power selected from the set of transmit powers specific to low latency or high reliability communications or semi-persistently scheduled communications.

At 335, UE 115-*b* may optionally transmit an uplink retransmission. transmitting the uplink communication according to the selected power control configuration (e.g., based on a first set of transmission parameters). In some cases, the uplink communication may be retransmitted according to the second set of transmission parameters, or using a transmit power adjustment with a step size consistent with the power control configuration selected at 325.

Figure 4:
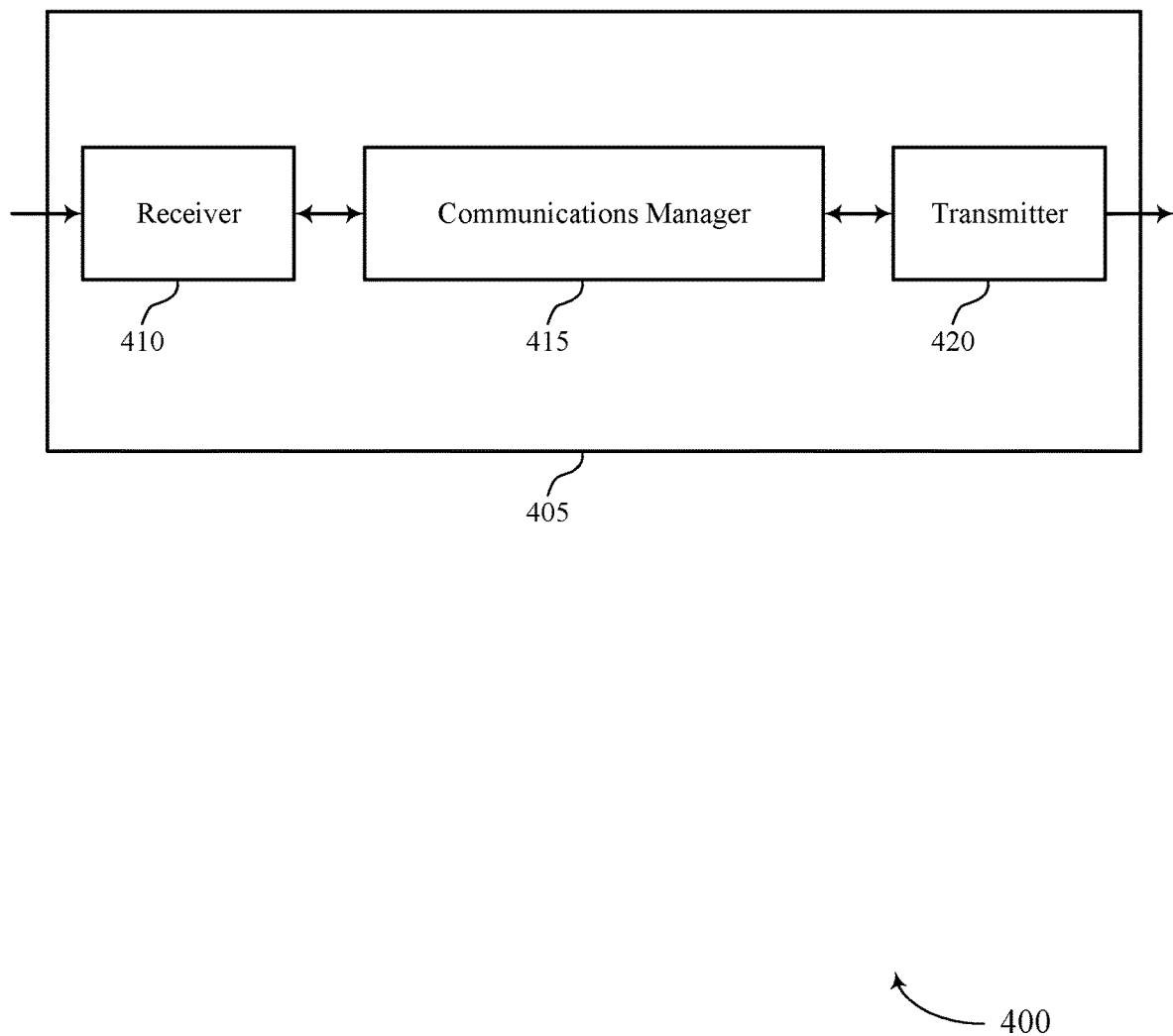
FIGS. 4 and 5 show block diagrams of devices that support power control optimization for wireless communications in accordance with aspects of the present disclosure.

FIG. 4 shows a block diagram 400 of a device 405 that supports power control optimization for wireless communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to power control optimization for wireless communications). Information may be passed on to other components of the device 405. The receiver 410 may be an example of aspects of the transceiver 720 described with reference to FIG. 7. The receiver 410 may utilize a single antenna or a set of antennas.

The communications manager 415 may identify an uplink communication by the UE, the uplink communication for reception by a set of reception points associated with one or more base stations and select, based on the identifying, a power control configuration for the uplink communication from a set of power control configurations corresponding to the set of reception points. The communications manager 415 may transmit the uplink communication according to the selected power control configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. One implementation may allow the device 405 to more efficiently coordinate power for low latency traffic. For example, the device 405 may identify a configuration to use for communications with a TRP, based on a received indication from a base station 105 or based on a default transmit power.

Based on implementing the feedback mechanism techniques as described herein, a processor of a UE 115 (e.g., controlling the receiver 410, the transmitter 420, or the transceiver 720 as described with reference to FIG. 7) may increase efficiency and decrease signaling overhead in the configuration of power control configurations at a UE 115.

Figure 5:
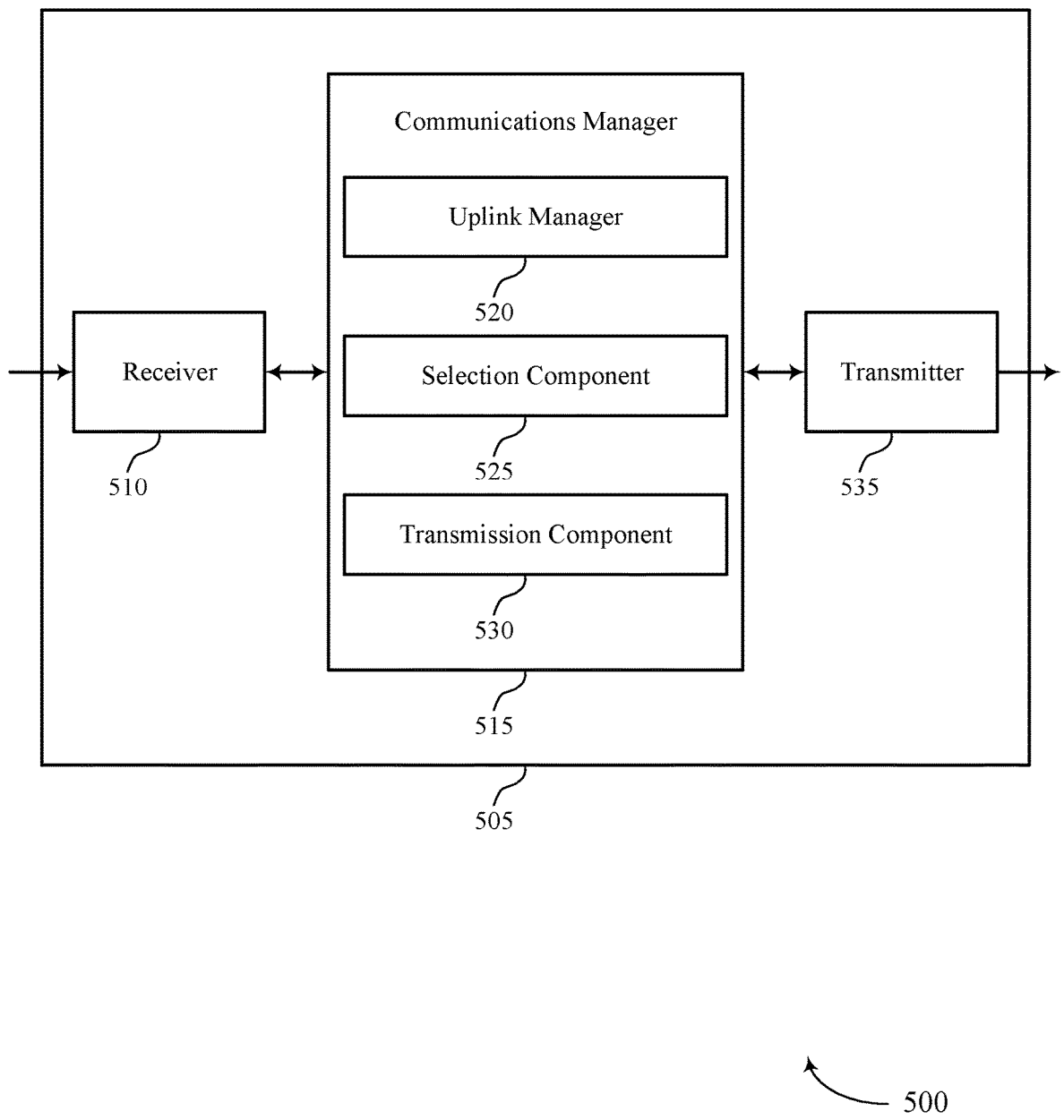

FIG. 5 shows a block diagram 500 of a device 505 that supports power control optimization for wireless communications in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to power control optimization for wireless communications). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an uplink manager 520, a selection component 525, and a transmission component 530. The communications manager 515 may be an example of aspects of the communications manager 710 described herein.

The uplink manager 520 may identify an uplink communication by the UE, the uplink communication for reception by a set of reception points associated with one or more base stations. The selection component 525 may select, based on the identifying, a power control configuration for the uplink communication, where the low latency power control configuration is selected from a set of power control configurations including one or more low latency power control configurations and one or more other power control configurations. The transmission component 530 may transmit the uplink communication according to the selected power control configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
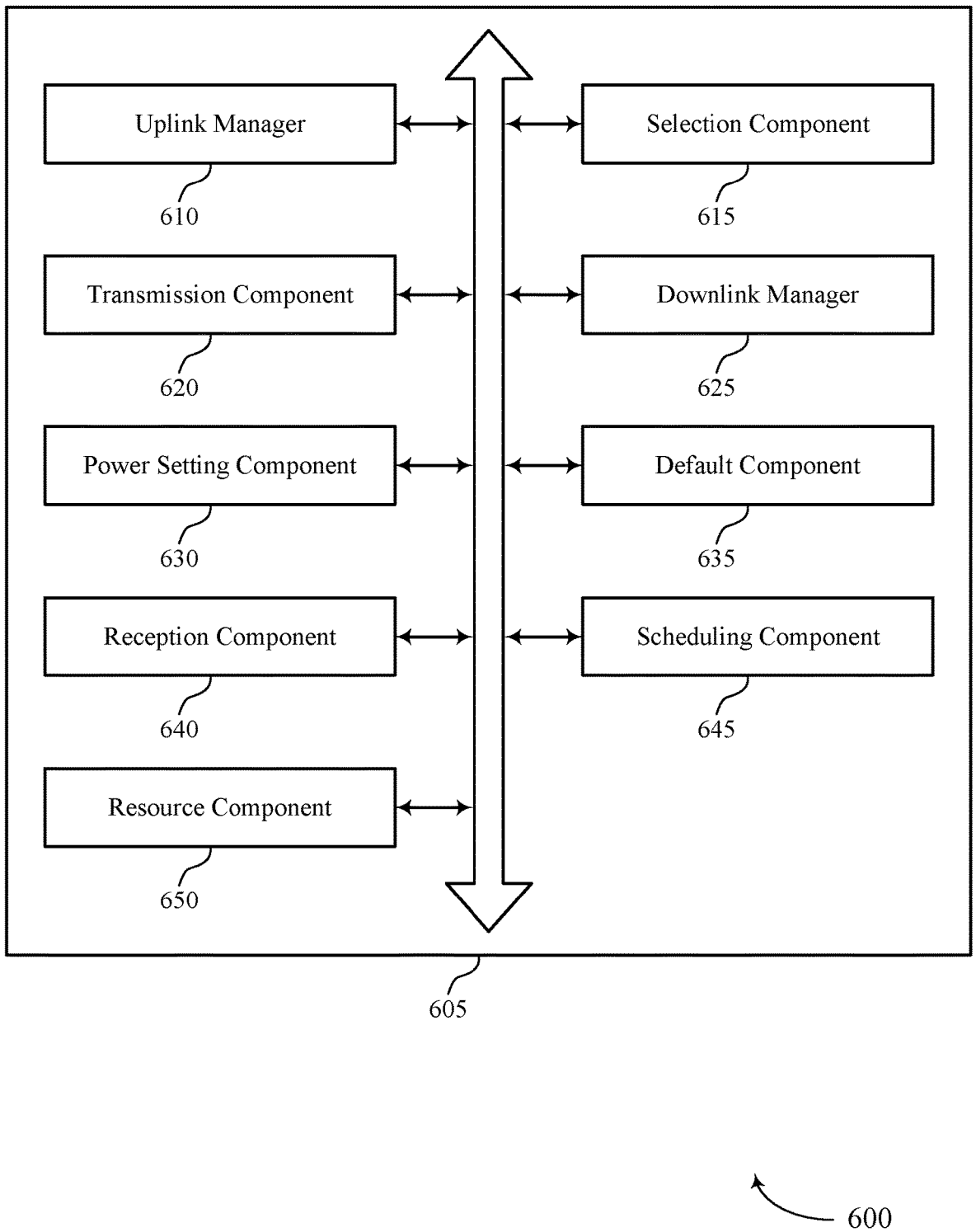
FIG. 6 shows a block diagram of a communications manager that supports power control optimization for wireless communications in accordance with aspects of the present disclosure.

FIG. 6 shows a block diagram 600 of a communications manager 605 that supports power control optimization for wireless communications in accordance with aspects of the present disclosure. The communications manager 605 may be an example of aspects of a communications manager 415, a communications manager 515, or a communications manager 710 described herein. The communications manager 605 may include an uplink manager 610, a selection component 615, a transmission component 620, a downlink manager 625, a power setting component 630, a default component 635, a reception component 640, a scheduling component 645, and a resource component 650. Each of these modules may communicate, directly or indirectly, with one another (e.g., via one or more buses).

The uplink manager 610 may identify an uplink communication by the UE, the uplink communication for reception by a set of reception points associated with one or more base stations. In some examples, the uplink manager 610 may receive, from the base station, an indication of a beam to use for the uplink communication, the beam associated with a reception point of the set.

The selection component 615 may select, based on identifying, a power control configuration for the uplink communication from a set of power control configurations corresponding to the set of reception points. In some examples, the selection component 615 may select the low latency power control configuration based on the path loss over the second bandwidth. In some cases, the selection component 615 may select a set of transmit powers specific to low latency or high reliability communications or semi-persistently scheduled communications. In some instances, the selection component 615 may select a transmit power from the set of transmit powers specific to low latency or high reliability communications or semi-persistently scheduled communications.

In some aspects, the selection component 615 may select a step size for transmit power adjustments specific to low latency or high reliability communications or semi-persistently scheduled communications. In some examples, selecting the power control configuration includes identifying a first set of transmission parameters for initial transmissions and identifying a second set of transmission parameters for retransmission. In some cases, the selection component 615 may select a set of transmission configuration profiles, where each transmission configuration profile in the set corresponds to a respective TRP.

The transmission component 620 may transmit the uplink communication according to the selected power control configuration. In some examples, the transmission component 620 may transmit the uplink communication at the selected transmit power. In some cases, the transmission component 620 may transmit the uplink communication according to the first set of transmission parameters. In some aspects, the transmission component 620 may retransmit the uplink communication according to the second set of transmission parameters. In some instances, the transmission component 620 may determine one or more transmit power parameters for transmitting the uplink communication based on the measuring. In some cases, the transmission component 620 may transmit the uplink communication via the beam associated with the reception point.

The downlink manager 625 may determine, at a physical layer of the UE, an RSRP for a reference signal received by the UE. In some examples, the downlink manager 625 may determine, at the physical layer of the UE, a path loss based on the RSRP. In some cases, the downlink manager 625 may determine a path loss of the downlink communication over a second bandwidth that is narrower than the first bandwidth. In some instances, the downlink manager 625 may measure the path loss based on a reference signal received via the set of RBs. In some aspects, the downlink manager 625 may measure a downlink communication according to the indicated transmission configuration profile. In some cases, the downlink manager 625 may measure a downlink communication based on the selected power control configuration. In some cases, the downlink manager 625 may determine one or more transmit power parameters for transmitting the uplink communication based on the measuring. In some aspects, the downlink communication includes a reference signal and measuring the downlink communication includes measuring an RSRP for the reference signal.

The power setting component 630 may set a transmit power for the uplink communication based on the RSRP as determined at the physical layer of the UE. In some examples, the power setting component 630 may set a transmit power for the uplink communication based on the RSRP. In some cases, the power setting component 630 may set a transmit power for the uplink communication based on the default transmit power for low latency or high reliability communications. In some instances, the power setting component 630 may set a transmit power for the uplink communication based on the default transmit power for the scheduling type. In some aspects, the received power includes an RSRP. In some examples, the power setting component 630 may set a transmit power for the uplink communication based on the path loss for the downlink communication.

The default component 635 may identify a default transmit power for low latency or high reliability communications. In some examples, the default component 635 may identify a default transmit power for the scheduling type.

The reception component 640 may receive, from a base station, an indication of the default transmit power for low latency or high reliability communications. In some examples, the reception component 640 may receive a downlink communication over a first bandwidth. In some cases, the reception component 640 may receive an indication of a transmission configuration profile in the set. In some examples, the reception component 640 may receive, from a base station of the one or more base stations, signaling that indicates the set of power control configurations corresponding to the set of reception points. In some examples, the selecting is further based at least in part on an indication of the power control configuration received from the one or more base stations. In some aspects, the indication of the power control configuration is received via a DCI message. In some aspects, the set of power control configurations includes, for each reception point of the set, a respective power control configuration in which the reception point is a primary reception point for the uplink communication. In some cases, the primary reception point may be a targeted or intended reception point. The scheduling component 645 may identify a scheduling type for the uplink communication. The resource component 650 may identify a set of RBs semi-persistently scheduled for the UE.

Figure 7:
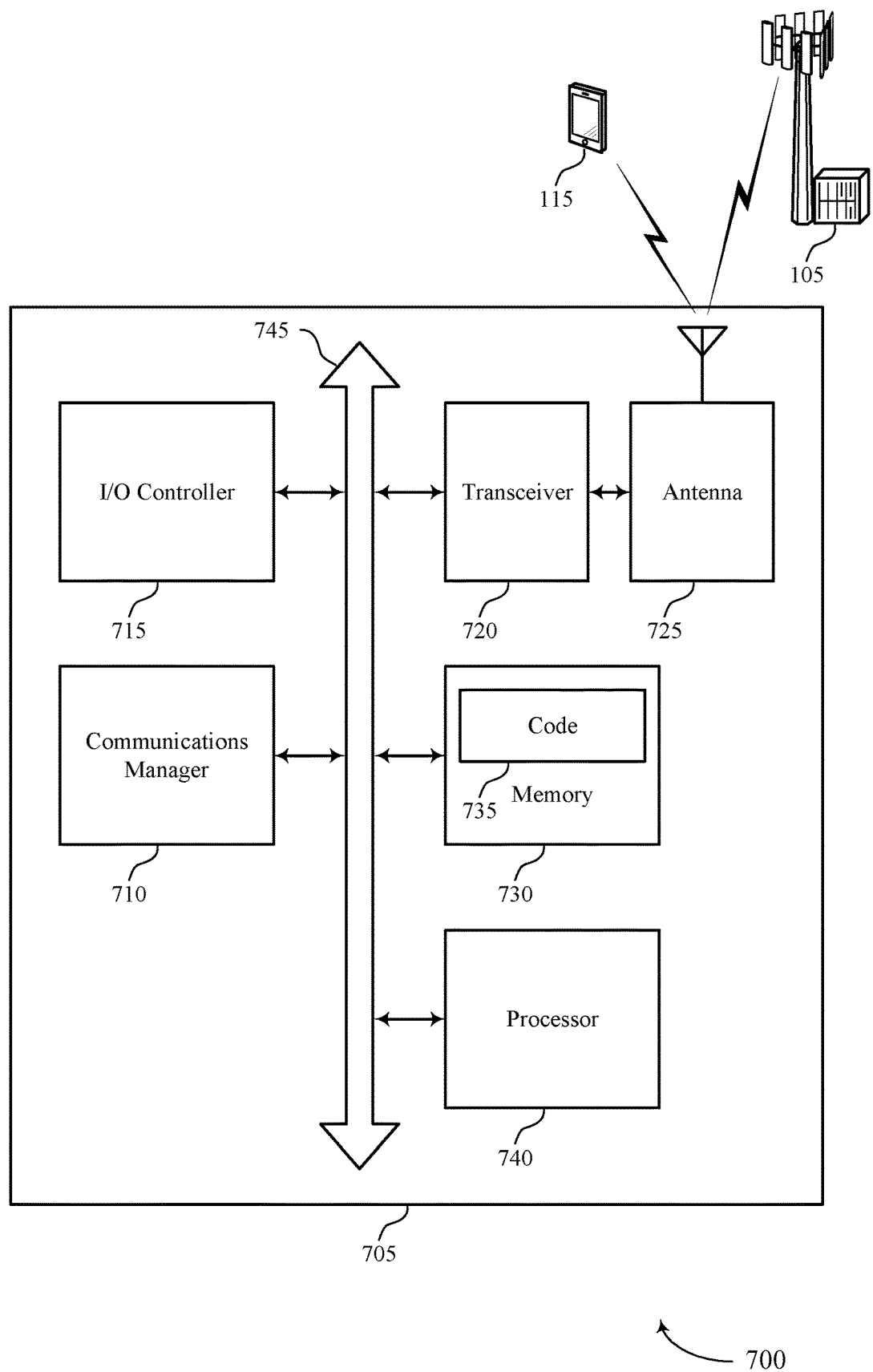
FIG. 7 shows a diagram of a system including a device that supports power control optimization for wireless communications in accordance with aspects of the present disclosure.

FIG. 7 shows a diagram of a system 700 including a device 705 that supports power control optimization for wireless communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify an uplink communication by the UE, the uplink communication for reception by a set of reception points associated with one or more base stations and select, based on identifying, a power control configuration for the uplink communication from a set of power control configurations corresponding to the set of reception points. The communications manager 710 may transmit the uplink communication according to the selected power control configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

The device 705 may include a single antenna 725. However, in some cases, the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting power control optimization for wireless communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
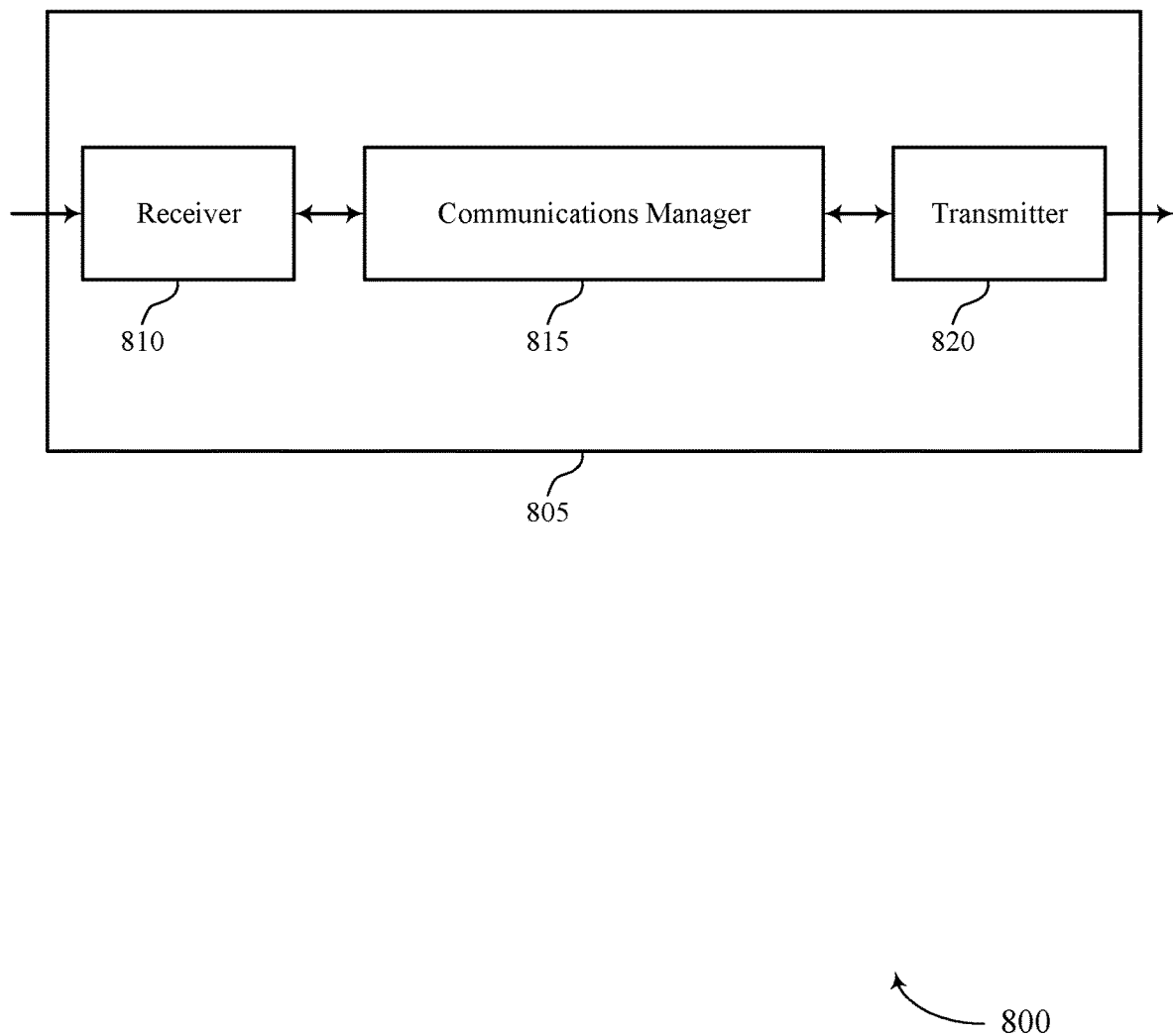
FIGS. 8 and 9 show block diagrams of devices that support power control optimization for wireless communications in accordance with aspects of the present disclosure.

FIG. 8 shows a block diagram 800 of a device 805 that supports power control optimization for wireless communications in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to power control optimization for wireless communications). Information may be passed on to other components of the device 805. The receiver 810 may be an example of aspects of the transceiver 1120 described with reference to FIG. 11. The receiver 810 may utilize a single antenna or a set of antennas.

The communications manager 815 may select a power control configuration for an uplink communication from a UE, the uplink communication for reception by a set of reception points, and the power control configuration included in a set of power control configurations corresponding to the set of reception points. The communications manager 815 may transmit, to the UE, an indication of the selected power control configuration and receive, from the UE, the uplink communication in accordance with the selected power control configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
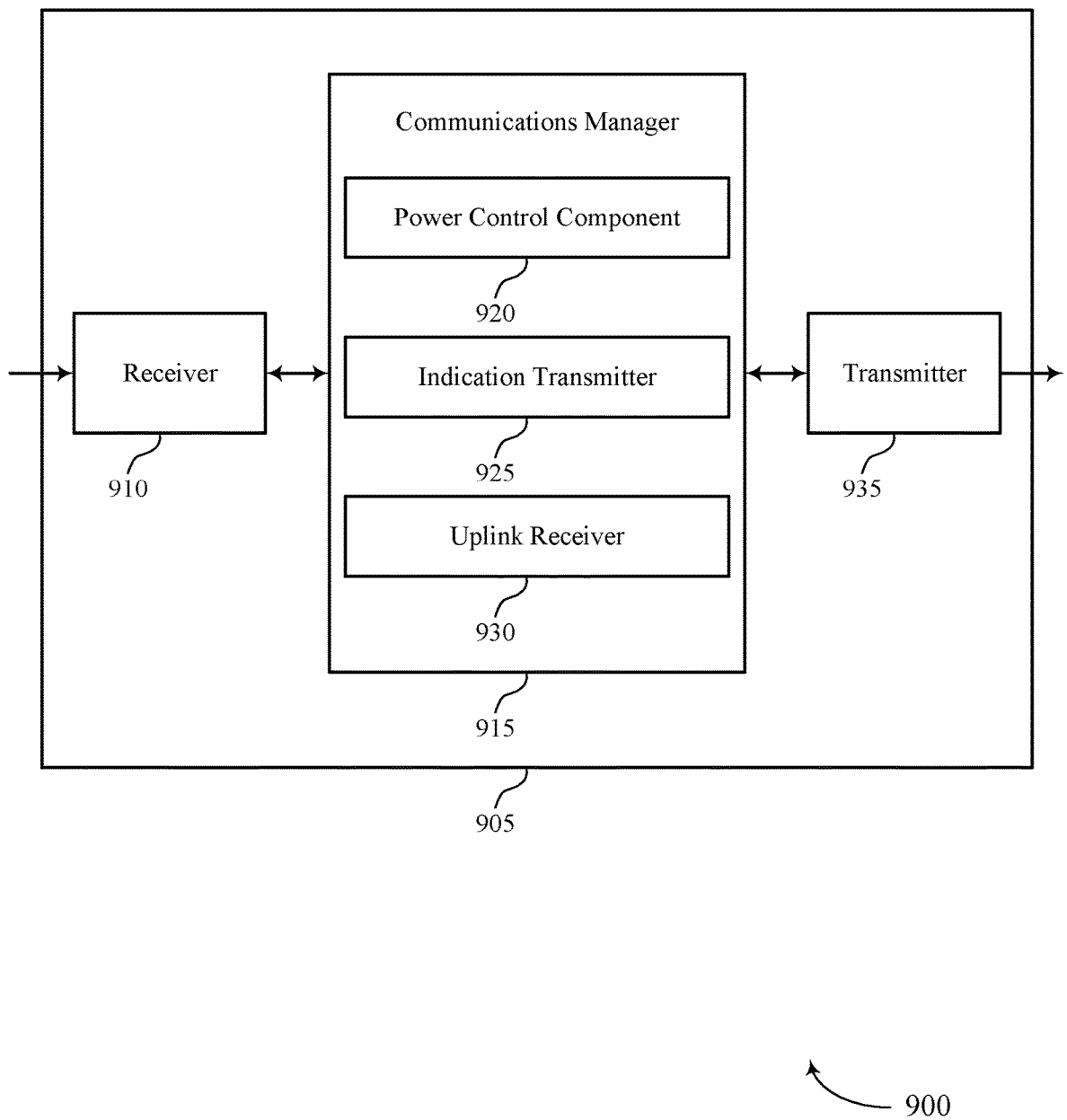

FIG. 9 shows a block diagram 900 of a device 905 that supports power control optimization for wireless communications in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to power control optimization for wireless communications). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a power control component 920, an indication transmitter 925, and an uplink receiver 930. The communications manager 915 may be an example of aspects of the communications manager 1110 described herein.

The power control component 920 may select a power control configuration for an uplink communication from a UE, the uplink communication for reception by a set of reception points, and the power control configuration included in a set of power control configurations corresponding to the set of reception points. The indication transmitter 925 may transmit, to the UE, an indication of the selected power control configuration. The uplink receiver 930 may receive, from the UE, the uplink communication in accordance with the selected power control configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
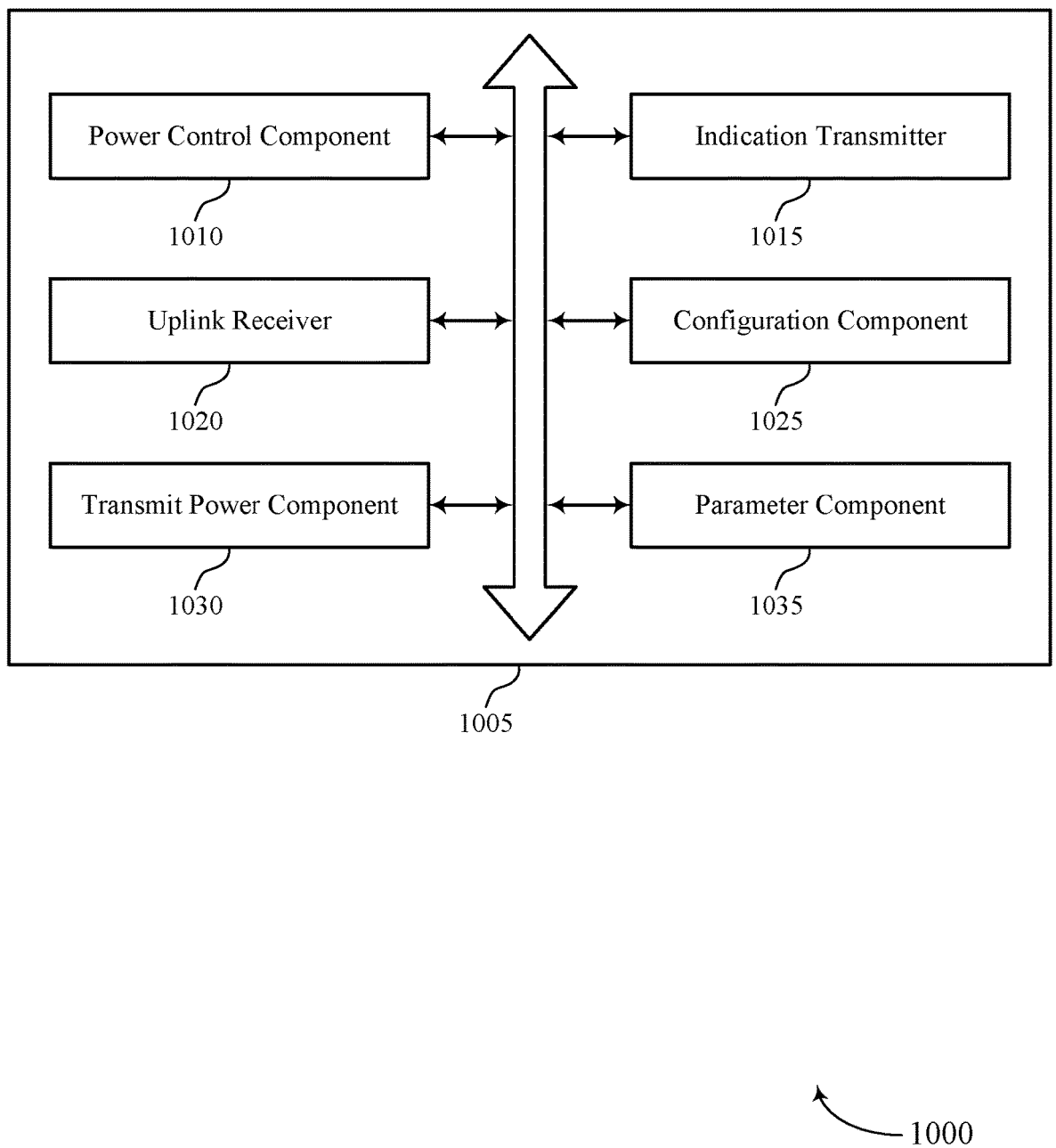
FIG. 10 shows a block diagram of a communications manager that supports power control optimization for wireless communications in accordance with aspects of the present disclosure.

FIG. 10 shows a block diagram 1000 of a communications manager 1005 that supports power control optimization for wireless communications in accordance with aspects of the present disclosure. The communications manager 1005 may be an example of aspects of a communications manager 815, a communications manager 915, or a communications manager 1110 described herein. The communications manager 1005 may include a power control component 1010, an indication transmitter 1015, an uplink receiver 1020, a configuration component 1025, a transmit power component 1030, and a parameter component 1035. Each of these modules may communicate, directly or indirectly, with one another (e.g., via one or more buses).

The power control component 1010 may select a power control configuration for an uplink communication from a UE, the uplink communication for reception by a set of reception points, and the power control configuration included in a set of power control configurations corresponding to the set of reception points. In some examples, the power control component 1010 may determine a default transmit power for low latency or high reliability communications. In some examples, the power control component 1010 may determine a default transmit power or step size for transmit power adjustments that is specific to low latency or high reliability communications or semi-persistently scheduled communications. In some cases, the power control component 1010 may determine a default transmit power for semi-persistently scheduled communications. In some instances, the power control component 1010 may determine a set of transmission configuration profiles, where each transmission configuration profile in the set corresponds to a respective TRP.

The indication transmitter 1015 may transmit, to the UE, an indication of the selected power control configuration. In some examples, the indication transmitter 1015 may transmit, to the UE, an indication to adjust the transmit power of low latency or high reliability communications by the UE based on physical layer measurements by the UE. In some cases, the indication transmitter 1015 may transmit, to the UE, an indication to adjust the transmit power of low latency or high reliability communications by the UE based on a measurement over a second bandwidth that is narrower than the first bandwidth. In some aspects, the second bandwidth corresponds to a set of one or more RBs semi-persistently scheduled for communications by the UE. In some cases, the indication transmitter 1015 may transmit, to the UE, an indication of a beam to use for the uplink communication, the beam associated with a reception point of the plurality.

In some examples, the indication transmitter 1015 may transmit, to a UE, signaling that indicates the set of power control configurations corresponding to the set of reception points. In some aspects, the indication of the selected power control configuration is transmitted via a DCI message. In some aspects, the set of power control configurations includes, for each reception point of the set, a respective power control configuration in which the reception point is a primary reception point for the uplink communication. In some examples, the primary reception point may be a targeted or intended reception point. In some examples, the indication transmitter 1015 may transmit, to the UE, an indication to adjust the transmit power of the uplink communications by the UE based on physical layer measurements by the UE.

The uplink receiver 1020 may receive, from the UE, the uplink communication in accordance with the selected power control configuration. The configuration component 1025 may configure the UE for communications over a first bandwidth. The transmit power component 1030 may determine a set of transmit powers specific to low latency or high reliability communications or semi-persistently scheduled communications. The parameter component 1035 may determine a first set of transmission parameters for initial transmissions and a second set of transmission parameters for retransmission.

Figure 11:
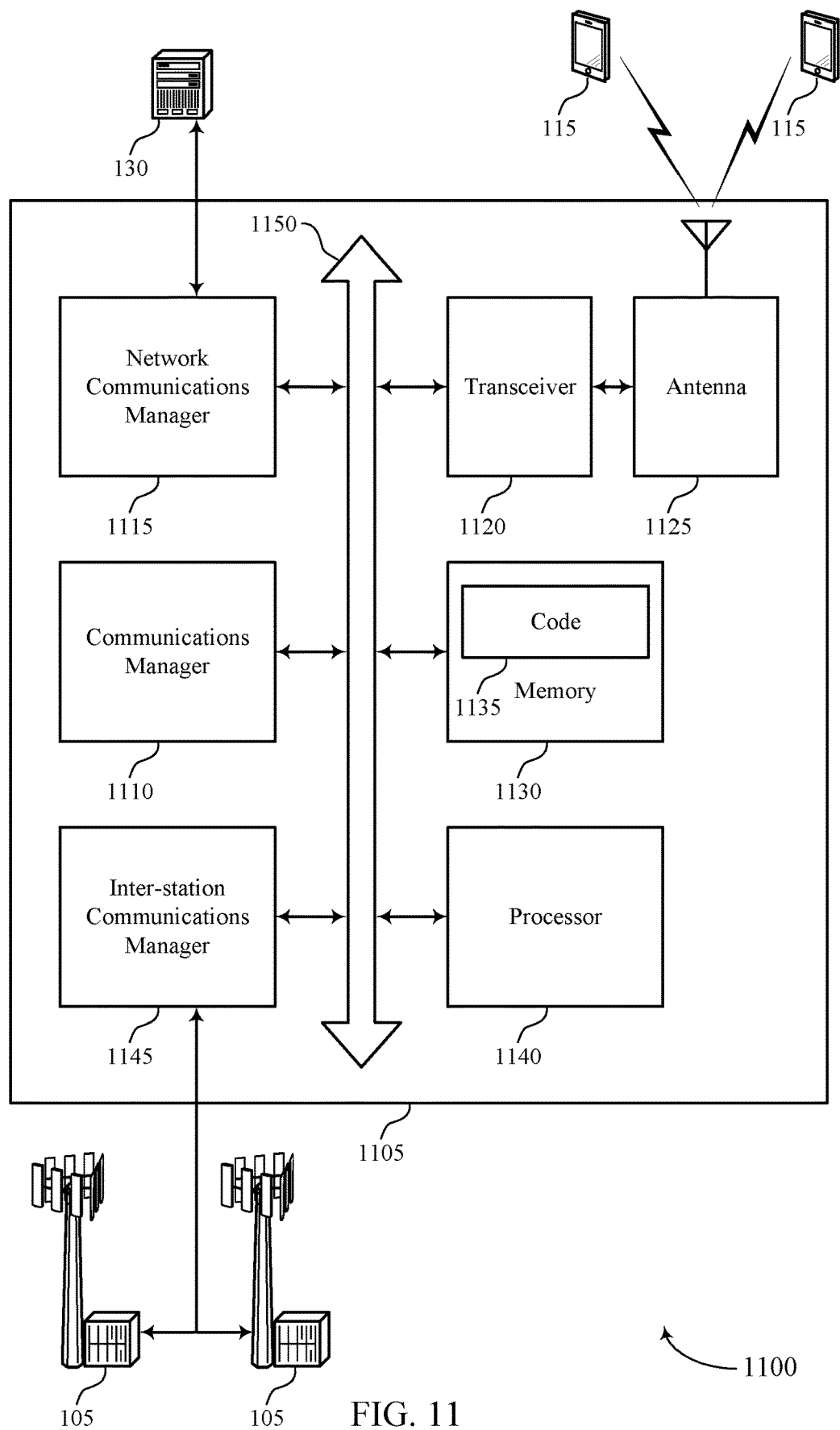
FIG. 11 shows a diagram of a system including a device that supports power control optimization for wireless communications in accordance with aspects of the present disclosure.

FIG. 11 shows a diagram of a system 1100 including a device 1105 that supports power control optimization for wireless communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may select a power control configuration for an uplink communication from a UE, the uplink communication for reception by a set of reception points, and the power control configuration included in a set of power control configurations corresponding to the set of reception points, transmit, to the UE, an indication of the selected power control configuration, and receive, from the UE, an uplink communication in accordance with the selected power control configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

The device 1105 may include a single antenna 1125. However, in some cases, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device #{device} to perform various functions (e.g., functions or tasks supporting power control optimization for wireless communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
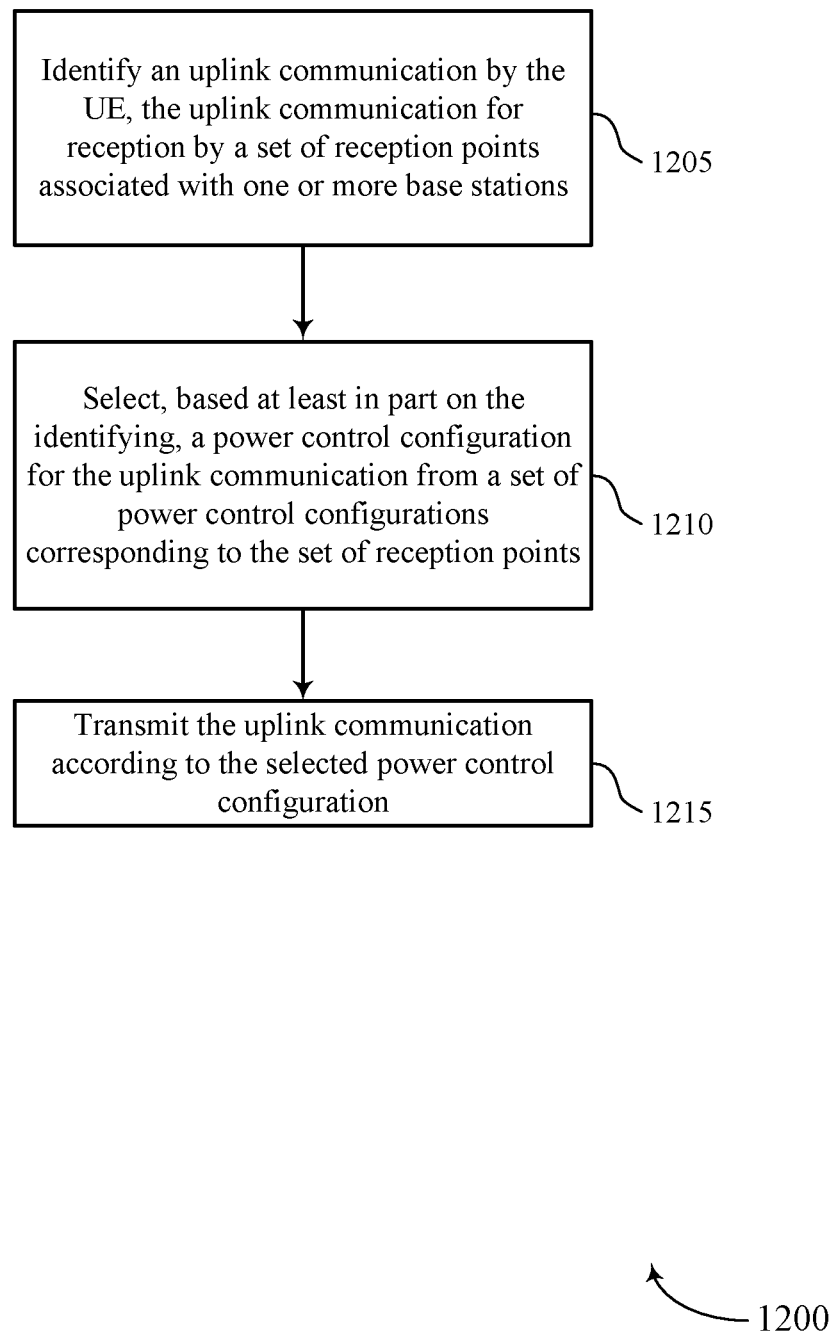
FIGS. 12 through 15 show flowcharts illustrating methods that support power control optimization for wireless communications in accordance with aspects of the present disclosure.

FIG. 12 shows a flowchart illustrating a method 1200 that supports power control optimization for wireless communications in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify an uplink communication by the UE, the uplink communication for reception by a set of reception points associated with one or more base stations. The operations of 1205 may be performed according to the methods described herein. In some examples, aspects of the operations of 1205 may be performed by an uplink manager as described with reference to FIGS. 4 through 7.

At 1210, the UE may select, based on identifying, a power control configuration for the uplink communication from a set of power control configurations corresponding to the set of reception points. The operations of 1210 may be performed according to the methods described herein. In some examples, aspects of the operations of 1210 may be performed by a selection component as described with reference to FIGS. 4 through 7.

At 1215, the UE may transmit the uplink communication according to the selected power control configuration. The operations of 1215 may be performed according to the methods described herein. In some examples, aspects of the operations of 1215 may be performed by a transmission component as described with reference to FIGS. 4 through 7.

Figure 13:
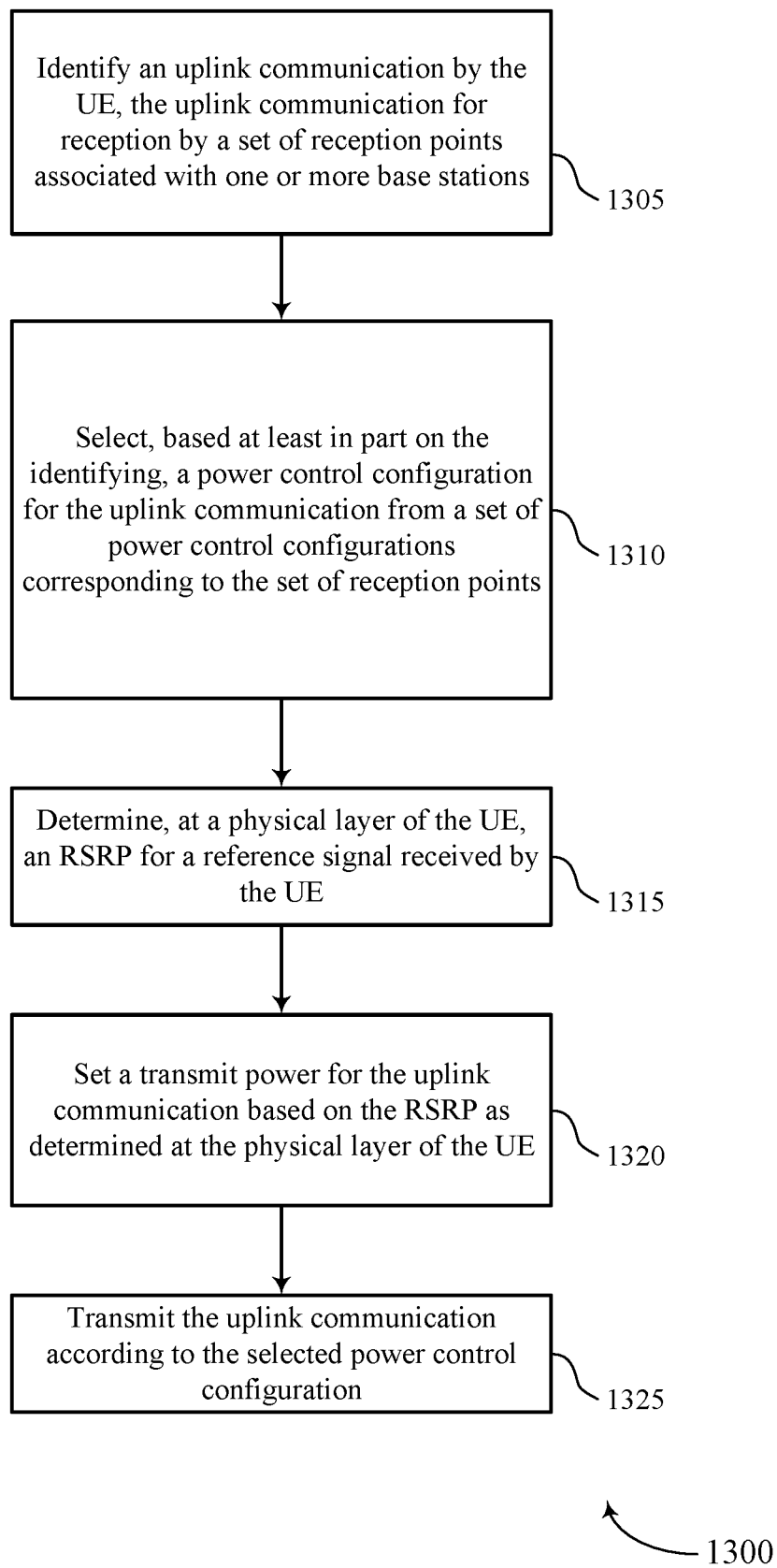

FIG. 13 shows a flowchart illustrating a method 1300 that supports power control optimization for wireless communications in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify an uplink communication by the UE, the uplink communication for reception by a set of reception points associated with one or more base stations. The operations of 1305 may be performed according to the methods described herein. In some examples, aspects of the operations of 1305 may be performed by an uplink manager as described with reference to FIGS. 4 through 7.

At 1310, the UE may select, based on identifying, a power control configuration for the uplink communication from a set of power control configurations corresponding to the set of reception points. The operations of 1310 may be performed according to the methods described herein. In some examples, aspects of the operations of 1310 may be performed by a selection component as described with reference to FIGS. 4 through 7.

At 1315, the UE may determine, at a physical layer of the UE, an RSRP for a reference signal received by the UE. The operations of 1315 may be performed according to the methods described herein. In some examples, aspects of the operations of 1315 may be performed by a downlink manager as described with reference to FIGS. 4 through 7.

At 1320, the UE may set a transmit power for the uplink communication based on the RSRP as determined at the physical layer of the UE. The operations of 1320 may be performed according to the methods described herein. In some examples, aspects of the operations of 1320 may be performed by a power setting component as described with reference to FIGS. 4 through 7.

At 1325, the UE may transmit the uplink communication according to the selected power control configuration. The operations of 1325 may be performed according to the methods described herein. In some examples, aspects of the operations of 1325 may be performed by a transmission component as described with reference to FIGS. 4 through 7.

Figure 14:
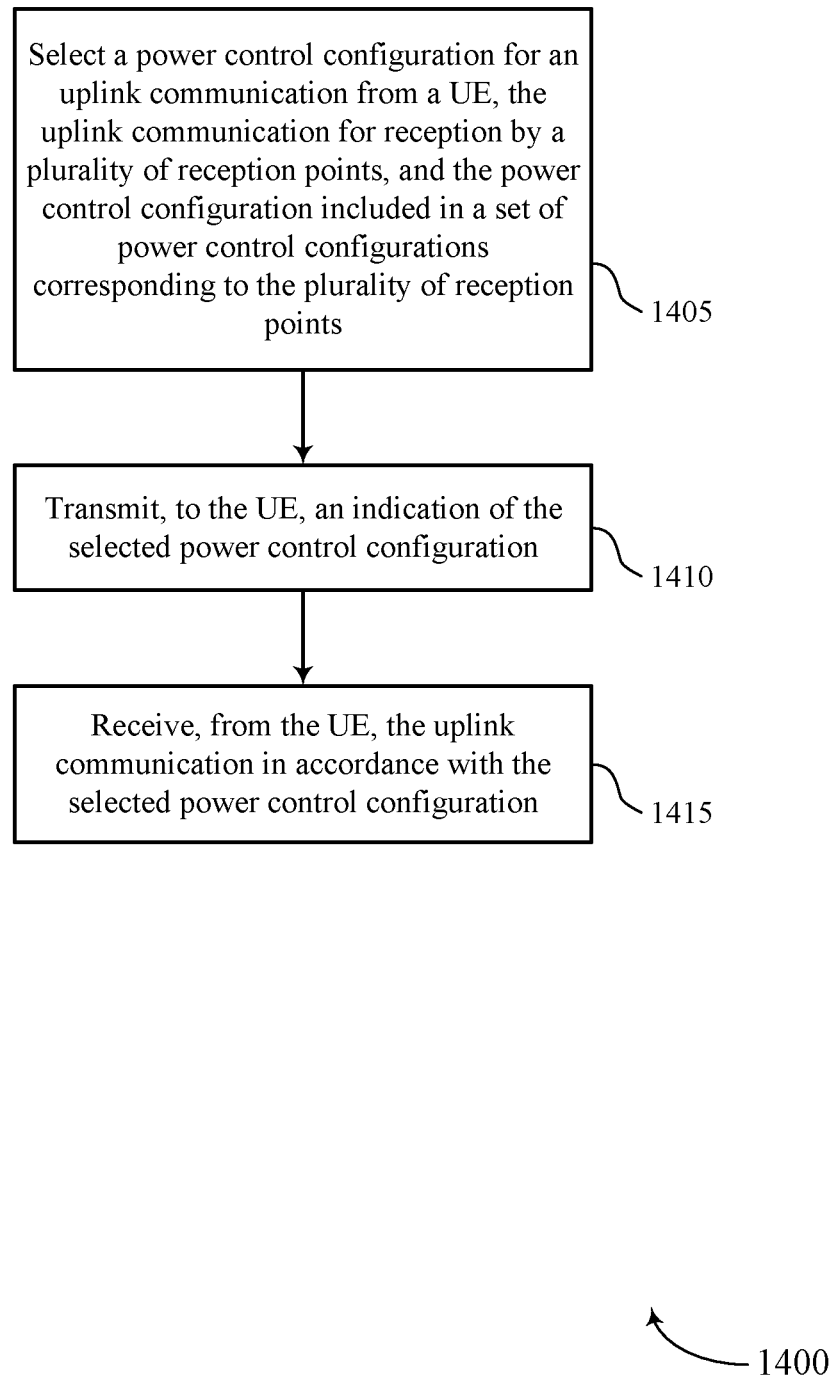

FIG. 14 shows a flowchart illustrating a method 1400 that supports power control optimization for wireless communications in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may select a power control configuration for an uplink communication from a UE, the uplink communication for reception by a plurality of reception points, and the power control configuration included in a set of power control configurations corresponding to the plurality of reception points. The operations of 1405 may be performed according to the methods described herein. In some examples, aspects of the operations of 1405 may be performed by a power control component as described with reference to FIGS. 8 through 11.

At 1410, the base station may transmit, to the UE, an indication of the selected power control configuration. The operations of 1410 may be performed according to the methods described herein. In some examples, aspects of the operations of 1410 may be performed by an indication transmitter as described with reference to FIGS. 8 through 11.

At 1415, the base station may receive, from the UE, the uplink communication in accordance with the selected power control configuration. The operations of 1415 may be performed according to the methods described herein. In some examples, aspects of the operations of 1415 may be performed by an uplink receiver as described with reference to FIGS. 8 through 11.

Figure 15:
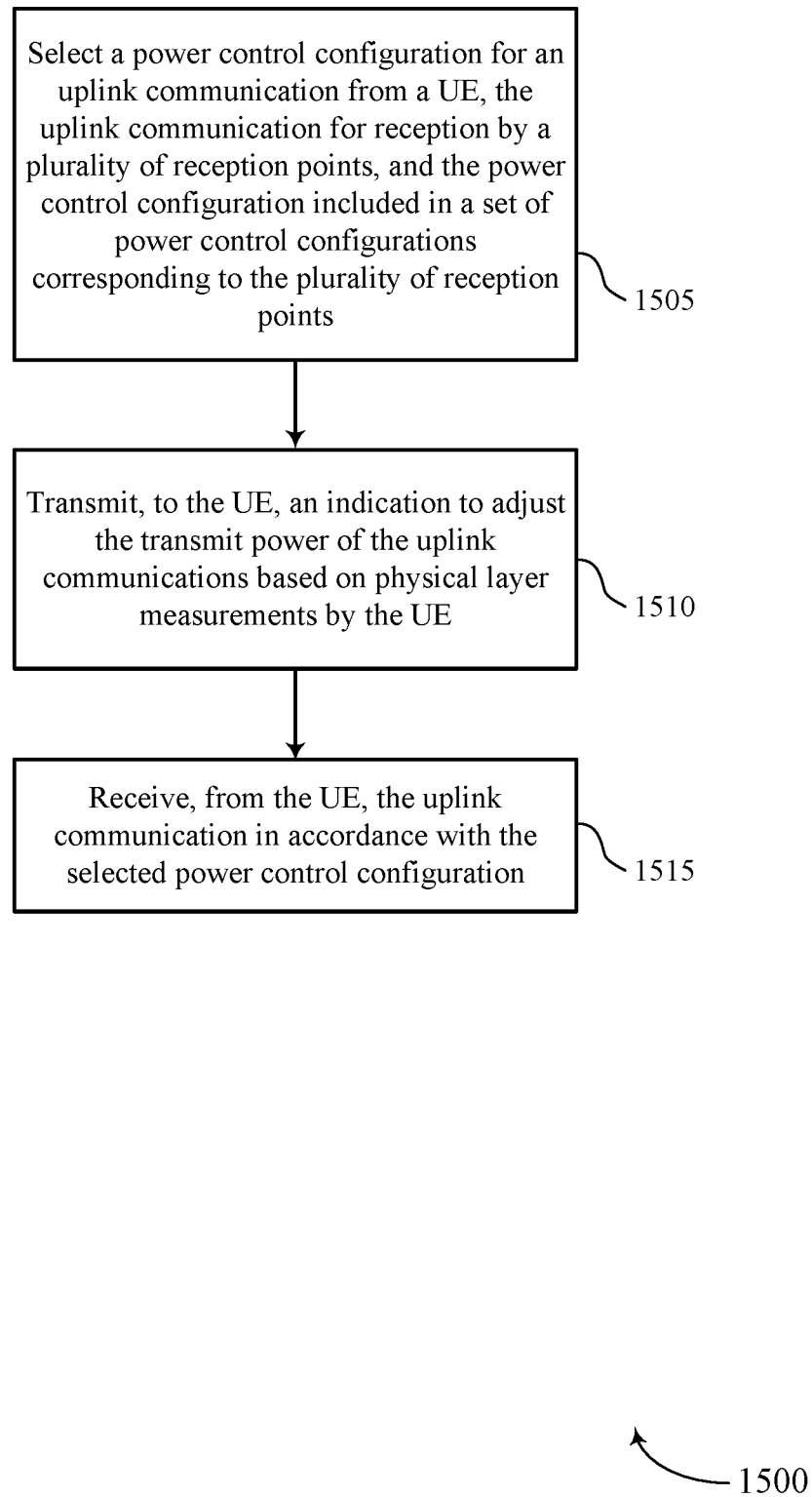

FIG. 15 shows a flowchart illustrating a method 1500 that supports power control optimization for wireless communications in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may select a power control configuration for an uplink communication from a UE, the uplink communication for reception by a plurality of reception points, and the power control configuration included in a set of power control configurations corresponding to the plurality of reception points. The operations of 1505 may be performed according to the methods described herein. In some examples, aspects of the operations of 1505 may be performed by a power control component as described with reference to FIGS. 8 through 11.

At 1510, the base station may transmit, to the UE, an indication to adjust the transmit power of the uplink communications based on physical layer measurements by the UE. The operations of 1510 may be performed according to the methods described herein. In some examples, aspects of the operations of 1510 may be performed by an indication transmitter as described with reference to FIGS. 8 through 11.

At 1515, the base station may receive, from the UE, the uplink communication in accordance with the selected power control configuration. The operations of 1515 may be performed according to the methods described herein. In some examples, aspects of the operations of 1515 may be performed by an uplink receiver as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems 100 and 200 or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a memory; and
   at least one processor coupled to the memory, wherein the at least one processor is configured to:
   select a power control configuration for an uplink communication based at least in part on an uplink communication type of the uplink communication, wherein the uplink communication is for reception by a plurality of reception points associated with one or more network devices, and wherein the power control configuration is included in a set of power control configurations corresponding to the plurality of reception points;
   determine a path loss at a layer, wherein the layer is based at least in part on the uplink communication type; and
   transmit the uplink communication according to the selected power control configuration, wherein, to transmit the uplink communication according to the selected power control configuration, the at least one processor is configured to transmit the uplink communication with a transmit power that is based at least in part on the path loss determined at the layer.

2. The apparatus of claim 1, wherein the at least one processor is further configured to:
   receive, from a network device of the one or more network devices, signaling that indicates the set of power control configurations corresponding to the plurality of reception points.

3. The apparatus of claim 1, wherein the at least one processor is further configured to:
   receive an indication of the power control configuration from a network device of the one or more network devices; and
   select the power control configuration further based at least in part on the indication of the power control configuration.

4. The apparatus of claim 3, wherein, to receive the indication of the power control configuration, the at least one processor is configured to:
   receive the indication of the power control configuration via a downlink control information (DCI) message.

5. The apparatus of claim 1, wherein the set of power control configurations comprises, for each reception point of the plurality of reception points, a respective power control configuration for which the respective reception point is a primary reception point for the uplink communication.

6. The apparatus of claim 1, wherein the at least one processor is further configured to:
   determine one or more transmit power parameters for transmitting the uplink communication based at least in part on: a measurement of a downlink communication based at least in part on the selected power control configuration.

7. The apparatus of claim 6, wherein the downlink communication comprises a reference signal, and wherein the measurement includes a reference signal received power (RSRP) for the reference signal.

8. The apparatus of claim 1, wherein the at least one processor is further configured to:
receive, from a network device of the one or more network devices, an indication of a beam to use for the uplink communication, the beam associated with a reception point of the plurality of reception points; and
wherein, to transmit the uplink communication according to the selected power control configuration, the at least one processor is configured cause the apparatus to transmit the uplink communication via the beam associated with the reception point.

9. The apparatus of claim 1, wherein the layer is a physical layer of the apparatus, and wherein the at least one processor is further configured to:
determine, at a physical layer of the apparatus, a reference signal received power (RSRP) for a reference signal received by the apparatus,
wherein the transmit power is based at least in part on the RSRP as determined at the physical layer of the apparatus.

10. The apparatus of claim 1, wherein the layer is a physical layer of the apparatus, and wherein the at least one processor is further configured to:
determine and filter a reference signal received power (RSRP) at the physical layer of the apparatus based at least in part on the uplink communication type; and
determine the path loss at the physical layer of the apparatus based at least in part on the uplink communication type, the path loss based at least in part on the RSRP determined and filtered at the physical layer of the apparatus,
wherein the transmit power is based at least in part on the path loss determined at the physical layer of the apparatus.

11. The apparatus of claim 1, wherein the uplink communication type comprises a low latency or high reliability communication type, and wherein:
the transmit power for the uplink communication is based at least in part on a default transmit power for the low latency or high reliability communication type.

12. The apparatus of claim 11, wherein the at least one processor is further configured to:
receive, from a network device of the one or more network devices, an indication of the default transmit power for the low latency or high reliability communication type.

13. The apparatus of claim 1, wherein the uplink communication type comprises a scheduling type for the uplink communication, and wherein:
the transmit power for the uplink communication is based at least in part on a default transmit power for the scheduling type.

14. The apparatus of claim 1, wherein the at least one processor is further configured to:
receive a downlink communication over a first bandwidth;
determine the path loss of the downlink communication over a second bandwidth that is narrower than the first bandwidth; and
select the power control configuration further based at least in part on the path loss over the second bandwidth.

15. The apparatus of claim 14, wherein, to determine the path loss over the second bandwidth, the at least one processor is configured to:
identify a set of resource blocks semi-persistently scheduled for the apparatus; and
measure the path loss based at least in part on a reference signal received via the set of resource blocks.

16. The apparatus of claim 1, wherein the uplink communication type comprises a low latency or high reliability communication type or a semi-persistently scheduled communication type.

17. The apparatus of claim 16, wherein, to transmit the uplink communication according to the selected power control configuration, the at least one processor is configured to:
transmit the uplink communication at the transmit power specific to the low latency or high reliability communication type or the semi-persistently scheduled communication type.

18. The apparatus of claim 16, wherein, to select the power control configuration, the at least one processor is configured to:
select a step size for transmit power adjustments specific to the low latency or high reliability communication type or the semi-persistently scheduled communication type.

19. The apparatus of claim 1, wherein the selected power control configuration comprises a first set of transmission parameters for initial transmissions and a second set of transmission parameters for retransmission, and wherein, to transmit the uplink communication according to the selected power control configuration, the at least one processor is configured to:
transmit the uplink communication according to the first set of transmission parameters; and
retransmit the uplink communication according to the second set of transmission parameters.

20. An apparatus for wireless communication, comprising:
a memory; and
at least one processor coupled to the memory, wherein the at least one processor is configured to:
select a power control configuration for an uplink communication from a user equipment (UE) based at least in part on an uplink communication type of the uplink communication, wherein a path loss is to be determined by the UE at a layer, the layer based at least in part on the uplink communication type, wherein the uplink communication is for reception by a plurality of reception points, and wherein the power control configuration is included in a set of power control configurations corresponding to the plurality of reception points;
transmit, to the UE, an indication of the selected power control configuration; and
receive, from the UE, the uplink communication in accordance with the selected power control configuration.

21. The apparatus of claim 20, wherein the at least one processor is further configured to:
transmit, to the UE, signaling that indicates the set of power control configurations corresponding to the plurality of reception points.

22. The apparatus of claim 20, wherein, to transmit the indication of the selected power control configuration, the at least one processor is configured to:
transmit the indication of the selected power control configuration via a downlink control information (DCI) message.

23. The apparatus of claim 20, wherein the set of power control configurations includes, for each reception point of the plurality of reception points, a respective power control configuration for which the respective reception point is a primary reception point for the uplink communication.

24. The apparatus of claim 20, wherein the at least one processor is further configured to:
 transmit, to the UE, an indication of a beam to use for the uplink communication, the beam associated with a reception point of the plurality of reception points.

25. The apparatus of claim 20, wherein, to transmit the indication of the selected power control configuration, the at least one processor is configured to:
 transmit, to the UE, an indication to adjust the transmit power of the uplink communication based at least in part on physical layer measurements by the UE.

26. The apparatus of claim 20, wherein the uplink communication type comprises a low latency or high reliability communication type or a semi-persistently scheduled communication type, and wherein, to select the power control configuration, the at least one processor is configured to:
 select a default transmit power or step size for transmit power adjustments that is specific to the low latency or high reliability communication type or the semi-persistently scheduled communication type.

27. The apparatus of claim 20, wherein, to transmit the indication of the selected power control configuration, the at least one processor is configured to:
 configure the UE for communications over a first bandwidth; and
 transmit, to the UE, an indication to adjust the transmit power of the uplink communication based at least in part on a measurement over a second bandwidth that is narrower than the first bandwidth.

28. The apparatus of claim 20, wherein, to select the power control configuration, the at least one processor is configured to:
 select a first set of transmission parameters for initial transmissions and a second set of transmission parameters for retransmissions.

29. A method of wireless communication performed by an apparatus, comprising:
 selecting a power control configuration for an uplink communication based at least in part on an uplink communication type of the uplink communication, wherein the uplink communication is for reception by a plurality of reception points, and wherein the power control configuration is included in a set of power control configurations corresponding to the plurality of reception points;
 determining a path loss at a layer, wherein the layer is based at least in part on the uplink communication type; and
 transmitting the uplink communication according to the selected power control configuration, wherein transmitting the uplink communication according to the selected power control configuration comprises transmitting the uplink communication with a transmit power that is based at least in part on the path loss determined at the layer.

30. A method of wireless communication performed by a network device, comprising:
 selecting a power control configuration for an uplink communication from a user equipment (UE) based at least in part on an uplink communication type of the uplink communication, wherein a path loss is to be determined by the UE at a layer, the layer based at least in part on the uplink communication type, wherein the uplink communication is for reception by a plurality of reception points, and wherein the power control configuration is included in a set of power control configurations corresponding to the plurality of reception points;
 transmitting, to the UE, an indication of the selected power control configuration; and
 receiving, from the UE, the uplink communication in accordance with the selected power control configuration.

* * * * *